United States Patent Office 3,372,978
Patented Mar. 12, 1968

3,372,978
FIBROUS MATERIAL CARRYING A DEPOSIT OF A CROSS-LINKED POLYMER
Robert E. Whitfield, Pleasant Hill, Allen G. Pittman, El Cerrito, and William L. Wasley, Berkeley, Calif., assignors to the United States of America as represented by the Secretary of Agriculture
No Drawing. Filed May 28, 1964, Ser. No. 371,150
15 Claims. (Cl. 8—127.6)

ABSTRACT OF THE DISCLOSURE

Fibrous materials, such as wool, cotton, rayon, nylon, etc., are modified by applying thereto a pre-formed polymer and cross-linking it to form a three-dimensional structure, the cross-linking being accomplished by reaction of the pre-formed polymer and the fixative at a phase boundary. In a typical embodiment, wool is first impregnated with an aqueous solution of the fixative, e.g., a diamine such as hexamethylene diamine. The wool is then impregnated with a solution of a pre-formed polymer in a water-immiscible solvent such as carbon tetrachloride. The polymer may be, for example, a copolymer of ethylene and methacryloyl chloride. By serial application of these solutions to the fabric, each fibrous element is coated with a two-phase system, for example, an inner layer of diamine in water and an outer layer of the highly reactive polymer in water-immiscible solvent. Under these conditions, the diamine and the polymer react almost instantaneously at the boundary between the phases, producing in situ on the fiber a cross-linked, insoluble, resin coating. By suitable selection of the complementary reactants, a wide variety of polymeric, fiber-modifying agents can be cross-linked in situ on fibers to yield such improvements as increased resistance to shrinkage when subjected to washing operations; increased resistance to soils, bleaches, and light; decreased tendency of the textiles to becoming creased or wrinkled, etc.

---

A non-exclusive, irrevocable, royalty-free license in the invention herein described, throughout the world for all purposes of the United States Government, with the power to grant sub-licenses for such purposes, is hereby granted to the Government of the United States of America.

A principal object of this invention is the provision of new methods for treating fibrous materials, particularly textiles. Another object of the invention is the provision of the novel products so produced. Further objects and advantages of the invention will be obvious from the following description wherein parts and percentages are by weight unless otherwise specified. The symbol $\phi$ is used throughout to designate the structure

In the processing of fibrous materials, e.g., textiles, it is often desired to modify the inherent properties of the materials, for example, to improve their shrinkage characteristics, to increase their resistance to soiling, to enhance their softness, etc. Various procedures have been advocated for such purposes and they usually involve applying to the fibrous substrate an agent having the chemical structure required to effect the desired modification of the fibers. Such agents—which may be generically termed fiber-modifying agents—are generally polymers of any of various classes, for example, polyethylene, polypropylene, or other polyolefines; chlorosulphonated polyethylenes; polyvinylpyrrolidones; polyepoxides; formaldehyde-melamine resins; vinyl polymers; starch and starch derivatives, etc. Ordinarily, application of the polymer with nothing more yields at best a temporary effect; the polymer is removed when the treated fibers are subjected to laundering or dry cleaning. To attain a more lasting effect, it is conventional to apply the polymer in conjunction with an agent—commonly termed a fixative or curing agent—in order to cause a cross-linking of the molecules of the polymer rendering it insoluble in water and dry-cleaning solvents. A universal feature of such procedures is that they require a curing operation at elevated temperatures to attain the desired insolubilization of the polymer. A typical procedure of this type is disclosed by Bruner et al. (Patent No. 2,678,286) who apply a solution containing (a) chlorosulphonated polyethylene and (b) a fixative such as hexamethylenediamine or 3-methoxyhexamethylene diamine to wool and then cure the treated wool at 150° C. for anywhere from 2 to 10 minutes. Such heat curing steps entail serious disadvantages. For one thing, they impede production by tying up large amounts of material. For example, in textile mills processing is conducted at rates of at least 25 yards per minute and it is obvious that if a heat cure of 10 minutes is required, 250 yards of material will constantly be tied up in the curing oven, hence not available for use or sale. Other disadvantages are the expense of the heating equipment, maintenance of the auxiliary devices such as guides, rollers, etc., and the cost of fuel. A further point is that heating at curing temperatures often is detrimental to the fibrous material, causing such deleterious changes as yellowing, loss in tensile strength and abrasion resistance, and other changes attributable to degradation of the fiber molecules. Wool is a typical example of a fiber which is readily yellowed and degraded by exposure to elevated temperatures, particularly when in contact with alkaline substances, e.g., curing agents containing amino groups.

A particular feature of the present invention is that essentially permanent modifications of fiber properties are attained without any heat-curing step. As a result, the invention yields the advantages of rapid and simple operation, decrease cost of production, and avoidance of fiber yellowing and degradation.

In accordance with the invention, the properties of a fibrous substrate are modified by applying thereto a pre-formed polymer and cross-linking it to form a three-dimensional structure, the cross-linking being accomplished by reaction of the pre-formed polymer and the fixative at a phase boundary. In a typical embodiment of the invention, wool is first impregnated with an aqueous solution of the fixative, e.g., a diamine such as hexamethylene diamine. The wool is then impregnated with a solution of a pre-formed polymer in a water-immiscible solvent such as carbon tetrachloride. The polymer may be, for example, a copolymer of ethylene and methacryloyl chloride, containing at least three COCl groups per molecule. By serial application of these solutions to the fabric, each fibrous element is coated with a two-phase system, for example, an inner layer of diamine in water and an outer layer of the highly reactive polymer in water-immiscible solvent. Under these conditions, the diamine and the polymer react almost instantaneously at the boundary between the phases, producing in situ on the fiber a cross-linked, insoluble, resin coating. By suitable selection of the complementary reactants, a wide variety of polymeric, fiber-modifying agents can be cross-linked in situ on fibers. It is to be particularly noted that no heat-curing step is needed—the serial application of the reactants is all that is necessary. The critical feature in this regard is that we provide a phase boundary-limited system whereby the cross-linking takes place directly—as soon as the reactants are applied—and hence there is no need for heat curing to promote the reaction.

In the patents of Miller et al. 3,078,138 and Whitfield et al. 3,079,216, 3,079,217, 3,084,018, 3,084,019, and 3,093,441 there are disclosed processes wherein linear condensation polymers—e.g., polyamides—are formed in situ on fibrous substrates by polymerizing complementary bifunctional polymer intermediates in an interfacial system. Thus in a typical embodiment thereof, wool is first impregnated with an aqueous solution of a diamine and then impregnated with a solution of a diacid chloride in a water-immiscible solvent such as carbon tetrachloride. Under these conditions, polymerization takes place at the interface between the mutually-immiscible phases, producing in situ a linear polyamide.

Although the procedures of the aforesaid patents provide very useful and practical results and are indeed in commercial use, they inherently possess certain limitations. The procedure of the present invention does not have these limitations and, moreover, provides results not obtainable by the prior techniques. These points are further explained as follows:

(1) A fundamental item is that the patented procedure utilizes an interfacial system to build a polymer from small units so that the procedure may accurately be termed interfacial polymerization and is so referred to hereinafter. On the other hand, the present procedure starts with a preformed polymer and utilizes an interfacial system to cross-link it. Thus, the present procedure may be considered as involving interfacial cross-linking of a preformed polymer. The distinction is not just a matter of words but involves basic and important distinctions. A vital point is that the patented system forms *linear* polymers. Bifunctional polymer-forming monomers are applied and a linear polymer is produced on the surface of the substrate. In contrast, in the present procedure a preformed linear polymer is initially applied as the primary reactant. The reaction which then occurs at the phase boundary is a cross-linking of this preformed polymer; that is, individual molecules of the original polymers are joined to another, forming a three-dimensional structure.

These distinctions are further demonstrated by the following illustrative formulas:

(a) Interfacial polymerization:

Since linear polymers contain independent chains, whereas cross-linked polymers contain interconnected chains, substantial distinctions in properties are displayed by the two forms of polymers. For example, linear polymers are soluble in organic solvents; they are fusible and display typical thermoplastic properties, i.e., they flow when heated. Cross-linked (thermo-setting) polymers are insoluble in organic solvents and at most are swelled thereby. Also, they are not fusible and do not exhibit plastic properties when heated, i.e., they do not flow.

(2) The interfacial polymerization system is limited to the formation of *condensation* polymers, i.e., polyamides, polyurethanes, polyureas, polyesters, polycarbonates, and interpolymers containing various combinations of amide, urethane, urea, ester, or carbonate groups. In contrast, the procedure of the present invention is not so limited. One can apply all kinds of polymers—not only condensation polymers but also addition polymers. As a matter of fact, the present invention is of particular advantage for the very reason that one can apply addition polymers, for example, polyolefines, polyacrylates, polyperfluoroacrylates, polyvinyls, and the like. Addition polymers have the benefits that they are readily available, relatively inexpensive, and, most importantly, offer a very wide spectrum of physical and chemical properties for the modification of the fibrous substrate. This last item is illustrated by the following examples: Application of elastomers such as chlorosulphonated polyethylene to confer such attributes as enhanced resiliency; polystyrene polymers to confer stiffness; perfluoroacrylates to provide resistance to soiling; etc. It is important to note at this point that addition polymers cannot be formed by the aforesaid interfacial polymerization technique; monomers required to form addition polymers will not polymerize under the conditions in question at any practical rate.

(3) In the interfacial polymerization system, permanency of fiber modification is attained only if the polymer becomes grafted to the fiber molecules. If the characteristics of the substrate are such that no grafting occurs,

| Hex | + | Seb | → .... Hex Seb Hex Seb Hex Seb Hex Seb .... |
|---|---|---|---|
| Hexamethylene diamine. | | Sebacoyl chloride. | Linear polymer containing alternating units derived from hexamethylene diamine and sebacoyl chloride. |

(b) In accordance with the invention:

| ..... EEEEEEMEEEEEEMEEEEEEM ..... | +Hex. |
|---|---|
| Preformed linear polymer of ethylene and methacryloyl chloride. | +Hexamethylene diamine. |

E=ethylene unit, M=methacryloyl chloride unit.

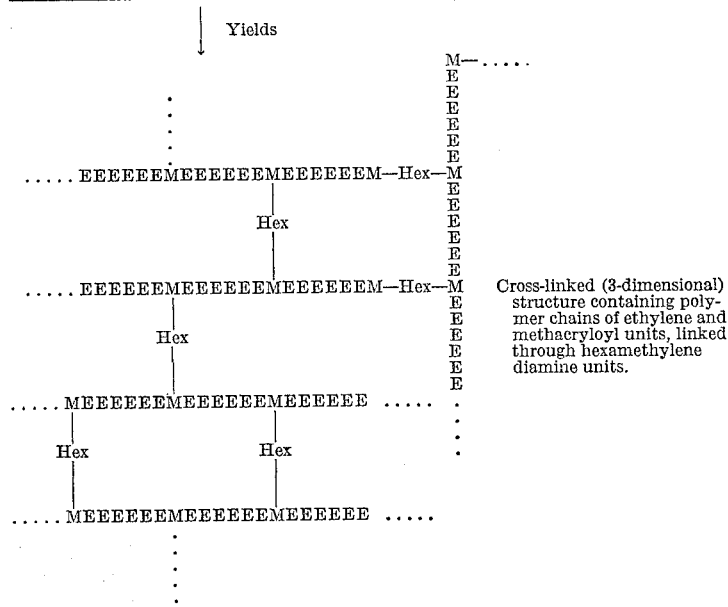

Cross-linked (3-dimensional) structure containing polymer chains of ethylene and methacryloyl units, linked through hexamethylene diamine units.

the polymer deposit is but temporary and is removed by such influences as laundering, dry-cleaning, mild abrasion, etc. However, in the process of the present invention grafting is not an essential factor. Permanence of modification depends on the fact that the applied polymer is cross-linked (by reaction with the fixative) to form a polymer which is 3-dimensional, hence inherently insoluble. Moreover, if grafting does occur, one attains a double-anchoring effect in that both the grafting and the cross-linking contribute to the permanence of the fiber modification. To sum up the situation, grafting is essential in the prior procedure where permanence of modification is required. In accordance with the present invention, permanence of fiber modification is attained by cross-linking a preformed polymer. Grafting, if it does occur, serves to reinforce the durability of the modification.

(4) Another item is that the interfacial polymerization procedure by its very nature yields polymers wherein polar groups (amide, urea, urethane, ester or carbonate groups) recur along the polymer chain in relatively close spacing. For example, polyhexamethylene sebacamide (produced by polymerizing hexamethylene diamine and sebacoyl chloride in situ on a fibrous substrate) will contain an amide group

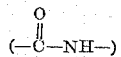

recurring after each group of 6 or 8 carbon atoms. Such polarity may be undesirable, for example, for instances where it is intended that the treated fibers display a high degree of hydrophobicity. On the contrary, the process of the present invention does not necessarily yield such highly polar products and, in fact, one can readily form cross-linked polymers which contain very lengthy chains completely free from polar radicals. Typically, this can be done by applying a polymer containing long hydrocarbon chains such as those of polyethylene, polypropylene, polybutylene, etc. The resulting cross-linked polymer will contain very long carbon chains between polar groups; indeed, these carbon chains may contain anywhere from 25 or 50 to hundreds of carbon atoms.

Component A.—The pre-formed polymer

In the practice of the invention, selection is made of the appropriate complementary agents to provide the desired modification of the fibers. These complementary agents will comprise a pre-formed polymer (hereinafter termed Component A) and the fixative or cross-linking agent (hereinafter termed Component B).

As noted hereinabove, the invention is of wide versatility and a multitude of different substances may be used as Component A. Basically, Component A may be any polymer which contains highly reactive groups and which is soluble in water or in organic solvents such as alcohol, acetone, hydrocarbons, or chlorinated hydrocarbons, etc. From a structural viewpoint, Component A is a linear polymer, with or without branching, which possess the above critical characteristics. It is preferred that Component A have a molecular weight of at least 1000 to provide adequate film-forming and fiber-modifying ability. The characteristic of solubility is desired so that the polymer can be uniformly applied to fibrous substrates in the form of a solution. The highly reactive groups are required to provide the sites for the eventual cross-linking of Component A in the phase boundary system. The expression "highly reactive group" is employed herein to designate a functional radical which on contact with a complementary functional radical under interfacial conditions will combine therewith rapidly and directly without requiring any after-treatments such as oven cures. Because of the facility with which these groups react on contact, they may also be termed contact-responsive or contact-effective functional groups. It is essential that there be at least two, preferably at least three, of these highly reactive groups per polymer molecule. For best results it is preferred that the number of highly reactive groups to be correlated with molecular weight of the polymer, employing a greater number as the polymer molecular weight is increased. Illustrative examples of highly reactive groups which may be present are carbonyl halide (—COX); sulphonyl halide (—SO$_2$X); haloformate (—OCOX); carbamyl halide (—NH—COX); isocyanate (—NCO);

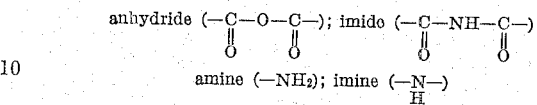

and hydroxy (—OH). In the above formulas X stands for a halogen, i.e., fluorine, chlorine, bromine, or iodine. The sulphur analogues of any of the above oxygen-containing species, e.g., —CSCl, —SCOCl, —SCSCl, —OCSCl, —NCS, —SH, etc., are also included within the ambit of the invention. The several highly reactive groups of Component A may be all the same or may be of different species. For example, the reactive groups may be two or more carbonyl chloride groups; two or more sulphonyl chloride groups; two or more amine groups; one carbonyl chloride group and one or more sulphonyl chloride groups; one amino group and one or more hydroxyl groups; one chloroformate group and one or more carbonyl chloride groups; etc. Other combinations of two or more different species of reactive groups will be evident from the above.

The expression "acid halide group" is used herein as generic to carbonyl halide, sulphonyl halide, haloformate, and carbamyl halide groups.

Illustrative types of polymers which may be employed as Component A are given below:

Component A.—Addition polymers

Basically, this embodiment of Component A may be considered as an addition polymer which contains pendant highly reactive groups of the types described above. Typically, these substances are prepared by copolymerizing two types of unsaturated monomeric materials, namely, a first ingredient used in major proportion (e.g., about 55 to 95 mole percent of the copolymerization system) and a second ingredient used in minor proportion (about 5 to 45 mole percent of the copolymerization system). Generally, the first ingredient is provided to contribute to the copolymer the desired high molecular weight and also to contribute to the polymer the ultimate properties desired to be imparted to the fibrous substrate in the cross-linking procedure. The second ingredient provides the pendant, highly reactive groups.

Typical examples of monomers which may be used as the major ingredient are:

Alkyl esters of acrylic acid and alkyl esters of any of the various α-alkylacrylic or α-haloacrylic acids, e.g., the methyl, ethyl, propyl, isopropyl, butyl, amyl, hexyl, octyl, decyl, dodecyl, tetradecyl, hexadecyl, octadecyl, cyclohexyl, oleyl, etc., esters of acrylic, methacrylic, ethacrylic, propacrylic, chloracrylic, bromoacrylic, etc. acids.

Aryl and aralkyl esters of acrylic acid or the α-substituted acrylic acids, e.g., phenyl, o-, m-, p-tolyl, dodecylphenyl, benzyl, phenylethyl, etc., esters of acrylic, methacrylic, ethacrylic, propacrylic, chloroacrylic, bromoacrylic, etc. acids.

Alkyl acrylates or methacrylates containing an oxygen bridge, typically methoxyethyl acrylate, ethoxyethyl acrylate, propoxyethyl acrylate, butoxyethyl acrylate, octoxyethyl acrylate, cyclohexoxyethyl acrylate, benzoxyethyl acrylate, phenoxyethyl acrylate, methoxyethyl methacrylate, phenoxyethyl methacrylate, etc.

Acrylates containing such radicals as thioether, sulphone, or sulphoxide, for example, the esters of acrylic acid or methacrylic acid with alcohols of the types:

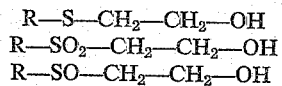

wherein R is an alkyl radical such as methyl, ethyl, propyl, butyl, etc., or an aryl or aralkyl radical such as phenyl, tolyl, benzyl, phenylethyl, etc.

Vinyl esters of fatty acids, e.g., vinyl acetate, propionate, butyrate, valerate, caprylate, caprate, laurate, myristate, palmitate, stearate, oleate, etc.

Allyl and methallyl esters of fatty acids, e.g., allyl and methallyl acetates, propionates, butyrates, valerates, caprylates, caprates, laurates, myristates, palmitates, stearates, oleates, etc.

N-dialkyl acrylamides and N-dialkyl α-substituted acrylamides, for example, N-dimethyl, N-diethyl, N-dipropyl, N-dibutyl, N-diamyl, N-dihexyl, N-dioctyl, N-didodecyl, etc., acrylamides, methacrylamides, ethacrylamides, propacrylamides, etc.

Olefinic hydrocarbons and halogenated olefinic hydrocarbons such as ethylene, propylene, butylene, isoprene, butadiene, styrene, chloroprene, α-methylstyrene, dimethylstyrene, vinyl naphthalene, dichlorostyrenes, vinyl chloride, vinyl bromide, vinylidene chloride, vinylidene bromide, vinyl fluoride, etc.

Ketones such as methyl vinyl ketone, ethyl vinyl ketone, isopropyl vinyl ketone and other alkyl vinyl ketones, methyl isopropyl ketone, methyl alkyl ketone, etc.

Itaconic diesters, for example, the dimethyl diethyl diisopropyl, dibutyl, dihexyl, didodecyl, and other dialkyl esters of itaconic acids. Diaryl and diaralkyl esters of itaconic acid, e.g., diphenyl itaconate, dibenzyl itaconate, di-(phenylethyl) itaconate, etc.

Other compounds containing the typical $CH_2=C<$ grouping such as cyanostyrenes, vinyl thiophene, vinyl pyridine, vinyl pyrrole, acrylonitrile, methacrylonitrile, alkyl vinyl sulphones such as ethyl vinyl sulphone. Compounds of the types:

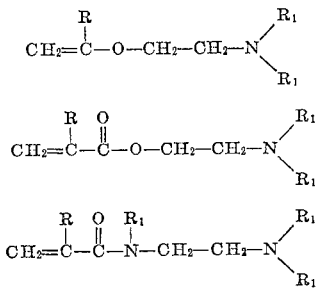

where R is H or $CH_3$ and wherein R, is a lower alkyl group such as $CH_3$, $C_2H_5$, etc.

Vinyl ethers, for example, monomers of the type $CH_2=CH-O-R$ wherein R is an alkyl radical such as methyl, ethyl, propyl, butyl, benzyl, etc.

In many cases, it is preferred that the major ingredient be a fluorine-containing monomer. Copolymers produced therefrom are useful to impart such characteristics to the fibrous substrates as resistance to both oil- and water-borne soils. Typical illustrative examples of fluorine-containing monomers are: perfluoro-t-butyl acrylate, perfluoro-t-butyl methacrylate, and esters of the type

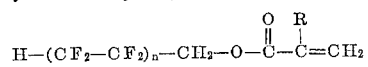

wherein R is H or $CH_3$ and $n$ is an integer from 2 to 6. Typical examples of this type of primary perfluoralkyl ester are: 1,1,5-trihydroperfluoropentyl acrylate and methacrylate, 1,1,7-trihydroperfluoroheptyl acrylate and methacrylate, 1,1,9-trihydroperfluorononyl acrylate and methacrylate, 1,1,11-trihydroperfluoroundecyl acrylate and methacrylate, 1,1,13-trihydroperfluorotridecyl acrylate and methacrylate, etc. Usually, it is preferred that the fluoroalkyl radical contain at least 3 fluorine atoms and an especially desirable type of fluoroalkyl ester for the multi-purpose treatment mentioned above is one wherein the fluoroalkyl radical not only contains at least 3 fluorine atoms but also has its omega carbon atom completely fluorinated. Typical of these particularly preferred fluoroalkyl esters are those of the type

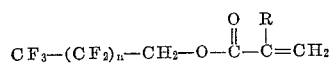

wherein R is H or $CH_3$ and $n$ is an integer of from 0 to 18. Illustrative examples of such compounds are the acrylic and methacrylic acid esters of: 1,1-dihydroperfluoropropyl alcohol, 1,1-dihydroperfluorobutyl alcohol, 1,1-dihydroperfluorohexyl alcohol, 1,1-dihydroperfluorooctyl alcohol, 1,1-dihydroperfluorodecyl alcohol, 1,1-dihydroperfluorododecyl alcohol, 1,1-dihydroperfluorohexadecyl alcohol, 1,1-dihydroperfluorooctadecyl alcohol, etc.

Another useful type of fluorine-containing monomer comprises the compounds of the structure

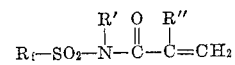

wherein $R_f$ is a saturated fluorocarbon structure containing from 4 to 18 fully fluorinated carbon atoms, R' is hydrogen or an alkyl group containing from 1 to 6 carbon atoms and R'' is hydrogen or a methyl group. Typical examples of particular compounds in this area are: N-methyl, N-perfluorobutanesulfonyl acrylamide; N-methyl, N-perfluorobutanesulfonyl methacrylamide; N-perfluoro (2 - methylcyclohexane)sulfonyl methacrylamide; N-methyl, N-perfluoro(4-methylcyclohexane)sulfonyl acrylamide; N-propyl, N-perfluoro(2-methylcyclohexane)sulfonyl methacrylamide; N-perfluorooctanesulfonyl acrylamide; N-perfluorooctanesulfonyl methacrylamide; N-ethyl, N-perfluorooctanesulfonyl acrylamide; N-isobutyl, N-perfluoro(4-ethylcyclohexane)sulfonyl acrylamide; N-isobutyl, N-perfluorodecanesulfonyl methacrylamide; N-propyl, N-perfluorododecanesulfonyl acrylamide; N-(n-hexyl), N-perfluorooctadecanesulfonyl acrylamide.

In cases where it is desired to impart water repellency to the fibrous substrate, one may employ as the major ingredient unsaturated monomers containing silicon. Typical in this category are the acryloxymethyl (or methacryloxymethyl) derivatives of organic silanes or polysiloxanes, for example, compounds of the types

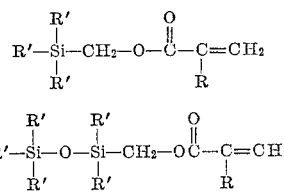

wherein R is hydrogen or methyl and the R''s are monovalent organic radicals, typically alkyl groups containing 1 to 18 carbon atoms, cyclohexyl, phenyl, toluyl, benzyl, diphenyl, or the like. Typical examples of compounds in this category are acryloxymethyl trimethylsilane, methacryloxymethyl trimethylsilane, acryloxymethyl dimethylphenylsilane, methacryloxymethyl dimethylphenylsilane, acryloxymethyl pentamethyldisiloxane, methacryloxymethyl pentamethyldisiloxane, etc.

Illustrative examples of the minor ingredient are as follows:

(1) Unsaturated monomers containing a carbonyl halide group, e.g., compounds of the formula

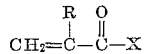

wherein R is hydrogen, an alkyl group such as methyl, ethyl, propyl, butyl, phenyl, etc., and wherein X is Cl, Br, F or I.

Styrene derivatives of the type

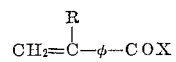

wherein X and R are as defined above.

(2) Unsaturated monomers containing a sulphonyl halide group, e.g., compounds of the formulae $$CH_2=\overset{R}{\underset{|}{C}}-SO_2X$$

$$CH_2=\overset{R}{\underset{|}{C}}-\phi-SO_2X$$

wherein R and X are as defined in (1) above.

(3) Unsaturated monomers containing carboxylic acid or sulphonic acid groups, for example $$CH_2=\overset{R}{\underset{|}{C}}-COOM$$

$$CH_2=\overset{R}{\underset{|}{C}}-SO_3M$$

$$CH_2=\overset{R}{\underset{|}{C}}-\phi-COOM$$

$$CH_2=\overset{R}{\underset{|}{C}}-\phi-SO_3M$$

wherein R is as defined in (1) above and wherein M is H or an alkali metal.

Copolymers made with these sulphonic- or carboxylic-containing monomers may be converted to the corresponding acid halide forms by, for example, reaction with a thionyl halide, phosphorus trichloride, or the like.

(4) Unsaturated monomers containing an isocyanate or isothiocyanate group, for example, compounds of the types $$CH_2=\overset{R}{\underset{|}{C}}-NCY$$

$$CH_2=\overset{R}{\underset{|}{C}}-CH_2-NCY$$

$$CH_2=\overset{R}{\underset{|}{C}}-\overset{O}{\underset{\|}{C}}-O-R'-NCY$$

$$CH_2=\overset{R}{\underset{|}{C}}-\phi-NCY$$

wherein R is as defined in (1) above, R' is a bivalent radical such as ethylene or other alkylene radical or a phenylene group etc., and Y is O or S.

(5) Unsaturated monomers containing an anhydride or imide group as, for example, maleic anhydride or imide, itaconic anhydride or imide, etc.

(6) Unsaturated monomers containing free amino groups or hydroxyl groups, for example, compounds of the types $$CH_2=\overset{R}{\underset{|}{C}}-CH_2-OH$$

$$CH_2=\overset{R}{\underset{|}{C}}-CH_2-NHR$$

$$CH_2=\overset{R}{\underset{|}{C}}-\overset{O}{\underset{\|}{C}}-O-R'-OH$$

$$CH_2=\overset{R}{\underset{|}{C}}-\overset{O}{\underset{\|}{C}}-O-R'-NHR$$

$$CH_2=\overset{R}{\underset{|}{C}}-\phi-OH$$

$$CH_2=\overset{R}{\underset{|}{C}}-\phi-NHR$$

wherein R is as defined in (1) above and R' is as defined in (4) above.

(7) Unsaturated monomers containing a haloformate or carbamyl halide group, for example $$CH_2=\overset{R}{\underset{|}{C}}-CH_2-OCOX$$

$$CH_2=\overset{R}{\underset{|}{C}}-CH_2-NH-COX$$

$$CH_2=\overset{R}{\underset{|}{C}}-\overset{O}{\underset{\|}{C}}-O-R'-OCOX$$

$$CH_2=\overset{R}{\underset{|}{C}}-\overset{O}{\underset{\|}{C}}-O-R'-NH-COX$$

$$CH_2=\overset{R}{\underset{|}{C}}-\phi-OCOX$$

$$CH_2=\overset{R}{\underset{|}{C}}-\phi-NHCOX$$

wherein R and X are as defined in (1) above and wherein R' is as defined in (4) above.

*Component A.—Converted addition polymers*

If desired, one may prepare addition polymers essentially free from highly reactive groups and then subject them to known reactions to introduce the necessary highly reactive groups. An example in this area is the chlorosulphonation of polyolefines such as polyethylene or polypropylene by reaction with $SO_2$ and $Cl_2$. This introduces chloro groups and sulphonyl chloride ($-SO_2Cl$) groups into the polymer. Another example is the partial hydrolysis of vinyl ester or vinyl ether polymers, to introduce hydroxyl groups into the polymer chain. Another example is a copolymer containing carboxy groups which are then converted into carbonyl halide groups by reacting the copolymer with such agents as thionyl chloride, phosphorus trichloride, or the like.

*Component A.—Condensation polymers*

Component A need not necessarily be an addition polymer; one may use condensation polymers of all types. Although some investigators employ the term "condensation polymer" only in respect to polymers wherein a low molecular weight by-product (such as $H_2O$ or $HCl$) is split out during polymer formation, we employ the term in the broader and accepted sense as designating any polymer which contains inter-unit functional groups not present in the monomers. Thus, we include such types as polyalkyleneimines, polyurethanes, polyureas, etc., whose formation is not ordinarily accompanied by any by-product elimination. Various types of condensation polymers which may be used in the practice of the invention are listed in the following paragraphs by way of illustration but not limitation.

*Component A.—Polyalkylene imines*

A useful class of polymers which can be used as Component A are the polyalkylene imines. A special feature of these is that they have built-in reactive groups on the polymer backbone, namely, internal imine ($-HN-$) groups and terminal amine ($-NH_2$) groups. Typical examples are the polymers of ethylene imine, propylene imine, 1,2-butylene imine, 2,3-butylene imine, 2,2-dimethyl ethylene imine, 2,2,3-trimethyl ethylene imine, 2,2-dimethyl-3-propyl ethylene imine, cyclohexyl ethylene imine, phenyl ethylene imine, etc. These compounds, as well known in the art, can be prepared, for example, by polymerizing the alkylene imine monomer in the presence of a catalyst such as sodium bisulphite, hydrochloric acid, sulphuric acid, acetic acid, hydrogen peroxide, etc. Generally, it is preferred to use the polyalkylene imines which are at least partially soluble in water.

Component A.—Polyesters

Polyesters derived from polyols such as ethylene glycol, propylene glycol, trimethylene glycol, hexamethylene glycol, glycerol, pentaerythritol, sorbitol, trimethylolpropane, etc., and dibasic acids such as succinic, adipic, sebacic, phthalic, terephthalic, hexahydrophthalic, maleic, and the like. By suitable adjustment of the proportions of reactants in known manner, the polyesters will contain free hydroxy groups. The resulting polyesters can be employed directly as Component A, utilizing the free hydroxy groups as the highly reactive groups. Another plan is to react the hydroxylated polyethers with a diacid chloride (or bischloroformate) to provide a polyether containing free carbonyl chloride (or chloroformate groups). In this connection, typical reactants are succinyl chloride, adipyl chloride, pimelyl chloride, sebacyl chloride, phthalyl chloride, ethylene glycol bischolorformate, diethylene glycol bischloroformate, hexane-1,6-diol bischloroformate, and the like. As well known in the art, the polyester and diacid chloride (or bischloroformate) are employed in such proportion as to provide a COCl/OH (or OCOCl/OH)

ratio of more than one to one whereby to ensure that the proudct contains free carbonyl chloride or chloroformate groups. In a preferred form of the invention, one uses polyesters containing free isocyanate groups. Such polymers can be readily prepared by reacting the hydroxylated polyester with a diisocyanate. Typical examples of the diisocyanates are o-, m-, or p-phenylene diisocyanate, toluene 2,4- (or 2,6-) diisocyanate, metaxylylene diisocyanate, 3,5,3',5'-bixylylene-4,4'-diisocayanate, etc. As well known in the art, the diisocyanate and polyester are employed in such proportion as to provide an NCO/OH ratio of more than one to one whereby to ensure that the product contains free NCO groups. Products of this type are sometimes referred to in the art as polyurethanes because they contain internal urethane groups, formed through combination of hydroxy groups of the polyester with isocyanate groups of the diisocyanate reactant.

Component A.—Polyethers

Polyethers derived, for example, by polymerizing an oxide (or epoxide, as they are often termed) with a polyhydric alcohol such as ethylene glycol, propylene glycol, trimethylene glycol, glycerol, pentaerythritol, sorbitol, trimethylolpropane, etc. Generally, the polyethers are derived from the simple alkylene oxides such as ethylene oxide or propylene oxide but one may also use such compounds as butylene oxide, isobutylene oxide, trimethylethylene oxide, dodecylene oxide, hexadecylene oxide, tetramethylethylene oxide, α-methylstyrene oxide, styrene oxide, cyclopentene epoxide, cyclohexene epoxide, vinyl cyclohexene epoxide, butadiene monoepoxide, naphthyl ethylene oxide, dipentene epoxide, 1,2-epoxy-2,4,4-trimethyl pentane (diisobutylene epoxide), 1,1-diphenylethylene oxide, epifluorohydrin, epichlorhydrin, epibromhydrin, 1,1,1-trifluoro-2-propylene oxide, 1,1,1-trifluoro-1-methyl-2-propylene oxide, 1,1,1-trifluoro-2-butene oxide, 1,1,1,2,2,3,3-heptafluoro-4-hexene oxide, hexylglycidyl ether, allylglycidyl ether, phenylglycidyl ether, 2-chloroethylglycidyl ether, o-chlorophenylglycidyl ether, methacrylchloride epoxide, 3-chloro-1,2-epoxybutane glycidol, methyl 9,10-epoxystearate, 3,4-epoxycyclohexyl cyanide, 2-methyl-2,3-epoxyhexanol, etc. The resulting polyethers can be employed directly as Component A, utilizing the free hydroxy groups as the highly reactive groups. In such case, it is preferred that the polyethers contain at least 3 hydroxy groups per molecule, obtainable by utilizing a polyhydric alcohol containing at least 3 hydroxy groups in the polymerization with the oxide monomer. Another plan is to react the hydroxylated polyether with a diacid chloride (or bischloroformate) to provide a polyether containing free carbonyl chloride (or chloroformate groups). In this connection, typical reactants are succinyl chloride, pimelyl chloride, sebacyl chloride, phthalyl chloride, ethylene glycol bischloroformate, diethylene glycol bischloroformate, hexane-1,6-diol bischloroformate, and the like. As well known in the art, the polyether and diacid chloride (or bischloroformate) are employed in such proportions as to furnish a COCl/OH (or OCOCl/OH)

ratio of more than one to one whereby to ensure that the product contains free carbonyl chloride or chloroformate groups. In a preferred form of the invention, one uses polyethers contianing free isocyanate groups. Such polymers can be readily prepared by reacting the hydroxylated polyether with a diisocyanate. Typical examples of the diisocyanates which may be reacted with the polyethers are o-, m-, or p-phenylene diisocyanates, toluene 2,4- (or 2,6-) diisocyanate, metaxylylene diisocyanate, 3,5,3',5'-bixylylene-4,4'-diisocayanate, 3,3'-bitolylene diisocyanate, diphenylmethane - 4,4'-diisocyanate, naphthalene-1,5-diisocyanate, etc. As well known in the art, the diisocyanate and polyether are employed in such proportions as to provide an NCO/OH ratio of more than one to one whereby to ensure that the product contains free isocyanate groups. These products are sometimes referred to as polyurethanes because they contain internal urethane groups, formed through the combination of hydroxy groups of the polyether with isocyanate groups of the diisocyanate reactant.

Component A.—Polyamides

The polyamides used in accordance with the invention are those derived from polyamines and polybasic acids. Methods of preparing these polyamides by condensation of polyamines and polycarboxylic acids are well known in the art and need not be described here. One may prepare polyamides containing free amino groups or free carboxylic acid groups. Generally, it is preferred to employ polyamides which contain free amino groups. The polyamides may be derived from such polyamines as ethylene diamine, diethylene triamine, triethylene tetramine, tetraethylene pentamine, 1,4-diamino butane, 1,3-diaminobutane, hexamethylene diamine, 3-(N-isopropylamino) propylamine, 3,3'-imino-bispropylamine, and the like. Typical polycarboxylic acids which may be condensed with the polyamines to form polyamides are glutaric acid, adipic acid, pimelic acid, suberic acid, azelaic acid, sebacic acid, isophthalic acid, terephthalic acid, betamethyl adipic acid, 1,2-cyclohexane dicarboxylic acid, malonic acid, polymerized fat acids, and the like. Depending on the amine and acid constituents and conditions of condensation, the polyamides may have molecular weights varying about from 1,000 to 10,000 and melting points about from 20–200° C. Particularly preferred for the purpose of the invention are the polyamides derived fom aliphatic polyamines and polymeric fat acids. Such products are disclosed, for example, by Cowan et al., Patent No. 2,450,940. Typical of these polyamides are those made by condensing ethylene diamine or diethylene triamine with polymeric fat acids produced from the polymerization of drying or semi-drying oils, or the free acids, or simple aliphatic alcohol esters of such acids. The polymeric fat acids may typically be derived from such oils as soybean, linseed, tung, perilla, oiticac, cottonseed, corn, tall, sunflower, safflower, and the like. As well known in the art, in the polymerization the unsaturated fat acids combine to produce a mixture of dibasic and higher polymeric acids. Usually the mixture contains a preponderant proportion of dimeric acids with lesser amounts of trimeric and higher polmeric acids, and some residual monomeric acid. Particularly preferred are the polyamides of low melting point (about 20–90° C.) containing free amino groups which may be produced by heating together an aliphatic polyamine, such as diethylene triamine, triethylene tetramine, 1,4-diaminobutane, tetraethylene pentamine, 1,3-diaminobutane, and the like, with the polymerized fat acids. Typical among these is a polyamide derived from diethylene triamine and dimerized soybean fatty acids.

Component A.—Other condensation types

A useful class of condensation polymers, particularly where it is desired to impart such qualities as shrink resistance, water repellency, resistance to water-borne soils, etc., are the polysiloxanes. Typical are the polymers containing a multiplicity of siloxane units of the structure

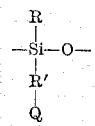

wherein R is a monovalent organic radical such as alkyl containing 1 to 18 carbon atoms, phenyl, benzyl, toluyl, biphenyl, cyclohexyl, or the like, R' is an alkylene group containing, for example, 2 to 10 carbon atoms, and Q is OH, $NH_2$, COCl, NCO or other highly reactive group as disclosed herein. Also typical are copolymers containing a multiplicity of units of the types

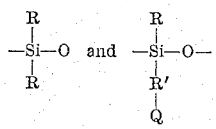

wherein R, R', and Q are as above. The polymers or co-polymers may be modified to introduce selected highly reactive groups. For example, polymers or copolymers containing free OH or $NH_2$ groups may be reacted with an excess of a diisocyanate, such as toluene diisocyanate, to provide a siloxane with free isocyanate groups. Similarly, polymers or copolymers containing free OH or $NH_2$ groups may be reacted with an excess of a diacid chloride or a bischloroformate—for example, adipoyl chloride or ethylene glycol bischloroformate—to produce a siloxane containing free carbonyl chloride or chloroformate groups.

Other classes of condensation polymers usable as Component A are: Polymers containing free amine or isocyanate groups prepared by copolymerizing a diamine such as hexamethylene diamine with a diisocyanate such as toluene diisocyanate. Polycarbonates containing free hydroxy or chloroformate groups, prepared by copolymerizing a polyol such as bisphenol A with ethylene glycol bischloroformate. Polycarbonates containing free hydroxy groups may be reacted with diisocyanates, as described hereinabove in connection with the polyesters, to provide a polycarbonate containing free isocyanate groups.

Component B.—The fixative

Component B may be any compound containing at least two highly reactive groups. As to these groups, the same choice is available as set forth hereinabove in connection with Component A and thus they may typically be of the following types: Carbonyl halide (—COX), sulphonyl halide (—$SO_2$X), haloformate (—OCOX), carbamyl halide (—NHCOX),

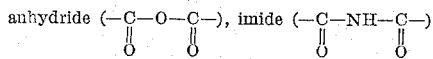

amine (—$NH_2$), imine (—NH—), hydroxy (—OH), isocyanate (—NCO). In the above formulas, X stands for F, Cl, Br, or I. The sulphur analogues of any of the above oxygen-containing species, e.g., —CSCl, —SCOCl, —SCSCl, —OCSCl, —NCS, —SH, etc., are also included within the ambit of the invention.

The several reactive groups of Component B may be all of the same species or of different species. For example, the reactive groups may be two or more carbonyl chloride groups; two or more sulphonyl chloride groups; two or more amine groups; one carbonyl chloride group and one or more sulphonyl chloride groups; one amine group and one or more hydroxyl groups; etc. Other combinations of two or more different species of reactive groups will be evident from the above illustrations.

It is, of course, obvious that in a practice of the invention one selects Components A and B so that they contain reactive groups which are in a complementary relation, that is, which are reactive with one another, whereby the desired cross-linking will take place. The following table illustrates how one may select the reactive groups on the respective Components A and B to ensure that they are in complementary (reactive) relationship:

COMPLEMENTARY REACTIVE GROUPS

| Reactive group on one component (A or B) | Complementary reactive group on complementary component (B or A) |
| --- | --- |
| Carbonyl halide | Amine, imine, hydroxy. |
| Sulphonyl halide | Do. |
| Haloformate | Do. |
| Carbamyl halide | Do. |
| Amine, imine, or hydroxy | Carbonyl halide, sulphonyl halide, haloformate, carbamyl halide, isocyanate, isothiocyanate, anhydride. |
| Isocyanate or isothiocyanate | Amine, imine, or hydroxy. |
| Anhydride or imide | Do. |

We generally prefer to employ systems wherein one component carries carbonyl halide, haloformate, or isocyanate groups and the other component carries groups containing active hydrogen atoms, i.e., hydroxy, amine, or imine groups. Of these, amine and imine groups are particularly preferred as providing especially rapid cross-linking. Systems with isocyanates and amines (or imines) offer the special benefit that the cross-linking does not produce any by-products, e.g., no hydrogen halide as in the acid halide-amine systems.

Since the goal of the phase boundary-limited reaction is to cross-link the preformed polymer (Component A), it is necessary that each of the Components A and B contain at least two reactive groups and, moreover, that the sum of the groups be five or more. For example, if the selected Component A contains two of the highly reactive groups, Component B should contain no less than three of the complementary reactive groups. If the selected Component A contains three of the reactive groups, it is evident that Component B may contain as few as two of the complementary groups. Moreover, as the molecular weight of Component A is increased, it is preferred that the sum of the reactive groups be more than five to assure the proximity of complementary reactive groups during the cross-linking reaction.

Illustrative examples of compounds which may be used as Component B are listed below:

Component B.—(Fixative) containing COX groups

Typically, one may employ compounds of the aliphatic, aromatic, or heterocyclic series containing at least two carbonyl halide (—COX) groups. The componds may be substituted if desired with non-interfering (non-functional) substituents such as ether groups, thioether groups, sulphone groups, etc. Typical examples of compounds in this category are listed below merely by way of illustration and not limitation: Phosgene, oxalyl chloride, maleyl chloride, fumaryl chloride, malonyl chloride, succinyl chloride, glutaryl chloride, adipyl chloride, pimelyl chloride, suberyl chloride, azelayl chloride, sebacyl chloride, cyclohexane-1,4-biscarbonyl chloride, phthalyl chloride, isophthalyl chloride, terephthalyl chloride, 4,4'-biphenyldicarbonyl chloride, β-hydromuconyl chloride, i.e., ClCO—$CH_2$—CH=CH—$CH_2$—COCl, diglycollic acid chloride, i.e., O($CH_2$—COCl)$_2$, higher homologues of this compound as O($CH_2$—$CH_2$—COCl)$_2$, dithiodiglycollic acid chloride, diphenylolpropanediacetic acid chloride, i.e., ($CH_3$)$_2$C($C_6H_4$O$CH_2$COCl)$_2$, trimellityl chloride, i.e., $C_6H_3$(COCl)$_3$, and the like. If desired, mixtures of different carbonyl halides may be used. It is also evident that the sulphur analogues of these compounds may be used and are included within the spirit of the invention. Thus, instead of using compounds containing two —COCl groups one may use compounds containing one —CSCl and one —COCl group or compounds containing two —CSCl groups. Moreover, although the carbonyl chlorides are preferred as they are reactive and relatively inexpensive, the corresponding fluorides, bromides, and iodides may be used.

It is generally preferred to use the aliphatic compounds containing two carbonylchloride groups in alpha, omega positions, particularly those of the type:

$$ClCO\text{---}(CH_2)_nCOCl$$

wherein $n$ has a value from 2 to 12. Another preferred category includes the compounds of the formula ClCO—A—COCl (where A is the benzene or cyclohexane radical), especially para-substituted compounds such as terephthalyl and hexahydroterephthalyl chlorides.

*Component B.—(Fixative) containing $SO_2X$ groups*

Typically, one may employ compounds of the aliphatic, aromatic, and heterocyclic series containing at least two sulphonyl halide (—$SO_2X$) groups. The compounds may be substituted if desired with non-interfering (non-functional) groups such as ether groups, thioether groups, sulphone groups, etc. Typical compounds in this category are listed below by way of illustration and not limitation: benzene-1,3-disulphonyl chloride, benzene-1,4-disulphonyl chloride, naphthalene-1,5-disulphonyl chloride, naphthalene-2,7-disulphonyl chloride, biphenyl-4,4′-disulphonyl chloride, hexane-1,6-disulphonyl chloride, cyclohexane-1,4-disulphonyl chloride, ethane-1,2-disulphonyl chloride, toluene disulphonyl chloride, p,p′-oxybis(benzenesulphonyl chloride), and compounds of the type $$XSO_2\text{---}(CH_2)_n\text{---}SO_2X$$

wherein X is F, Cl, Br, or I and $n$ has a value from 2 to 12.

*Component B.—(Fixative) containing OCOX groups*

Typically, one may employ compounds of the aliphatic, aromatic, or heterocyclic series containing at least two haloformate (—OCOX) groups. The compounds may be substituted if desired with non-interfering (non-functional) substituents such as sulphone groups, ether groups, thioether groups, etc. Typical examples of compounds in this category are listed below merely by way of illustration and not limitation: Ethylene glycol bischloroformate, diethylene glycol bischloroformate, 2,2-dimethyl propane 1,3-diol bischloroformate, propane-1,3-diol bischloroformate, butane-1,4-diol bischloroformate, hexane-1,6-diol bischloroformate, octane-1,8-diol bischloroformate, decane-1,10-diol bischloroformate, butane-1,2-diol bischloroformate, hexane-1,2-diol bischloroformate, 2-methoxyglycerol-1,3-bischloroformate, glycerol-1,2-bischloroformate, glycerol-1,3-bischloroformate, diglycerol bischloroformate, hexanetriol bischloroformate, pentaerythritol bischloroformate, cyclohexane-1,4-diol bischloroformate, hydroquinone bischloroformate, resorcinol bischloroformate, catechol bischloroformate, bischloroformate of 2,2-bis(parahydroxyphenyl) propane, bischloroformate of 2,2-bis(parahydroxyphenyl) butane, bischloroformate of 4,4′-dihydroxybenzophenone, bischloroformate of 1,2-bis(parahydroxyphenyl) ethane, naphthalene-1,5-diol bischloroformate, biphenyl-4,4′-diol bischloroformate, glycerol trichloroformate, pentaerythritol tetrachloroformate, and the like. If desired, mixtures of different bishaloformates may be used.

Among the preferred compounds are the aliphatic bischloroformates, for example, those of the type:

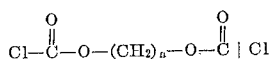

wherein $n$ has a value from 2 to 12. Another preferred category of compounds are the bis-chloroformates derived from polyethylene glycols, e.g.,

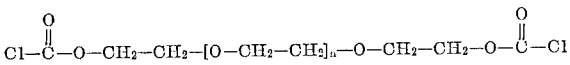

wherein $n$ has a value from zero to 10. A useful category of aromatic bischloroformates are the bisphenol chloroformates, that is, compounds of the type:

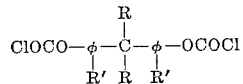

wherein R—C—R represents an aliphatic hydrocarbon group containing 1 to 12 carbon atoms, R′ is hydrogen or a lower alkyl radical.

It is also evident that the sulphur analogues of the bis-chloroformates may be used and such are included within the spirit of the invention. Thus, instead of using the compounds containing haloformate groups, one may use any of the compounds containing the sulphur analogues of these groups, for example, the compounds containing two or more groups of the formula

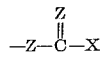

wherein one Z is sulphur and the other is oxygen or wherein both Z's are sulphur. The symbol X in the above formula stands for a halogen.

*Component B.—(Fixative) containing NHCOX groups*

Aromatic, aliphatic, or heterocyclic compounds containing at least two carbamyl halide (—NHCOX) groups. The compounds may be hydrocarbon carbamyl halides or may contain non-interfering (non-functional) groups such as ether, thioether, sulphone, etc., groups. Typical compounds in this category are given below by way of illustration and not by way of limitation: Ethylene dicarbamyl chloride, trimethylene dicarbamyl chloride, tetramethylene dicarbamyl chloride, hexamethylene dicarbamyl chloride, octamethylene dicarbamyl chloride, 2-methylpropane-1,2-dicarbamyl chloride, 2,6-dimethyloctane-2,7-dicarbamy chloride, cyclohexane-1,4-dicarbamyl chloride, diethyl ether-2,2′-dicarbamy chloride, diethyl thioether-2,2′-dicarbamyl chloride, piperazine dicarbamyl chloride, o-, m-, and p-phenylene dicarbamyl chloride, xylylene dicarbamyl chloride, and their sulphur analogues, i.e., the corresponding dithiocarbamyl chlorides. If desired, mixtures of different di- or tri-carbamyl halides may be used. It is generally preferred to use compounds of the type $$XCONH\text{---}(CH_2)_n\text{---}NHCOX$$

wherein X is F, Cl, Br, or I and $n$ has a value of 2 to 12.

*Component B.—(Fixative) containing $NH_2$ or NH groups*

Component B in this category may be any of the aromatic, aliphatic, or heterocyclic compounds containing at least two amine (—$NH_2$) or imine (—NH—) groups. The compounds may be hydrocarbon amines or imines or may contain non-interfering (non-functional) groups such as ether groups, thioether groups, sulphone groups, fluorine groups, etc. Typical compounds in this category are listed below by way of illustration but not limitation: Ethylene diamine, trimethylene diamine, tetramethylene diamine, hexamethylene diamine, octamethylene diamine, decamethylene diamine, N,N′-dimethyl-1,3-propanediamine, 1,2-diamino-2-methylpropane, 2,7 - diamino - 2,6-dimethyloctane, N,N′-dimethyl-1,6-hexanediamine, 1,4-diaminocyclohexane, 1,4-bis-(aminomethyl) cyclohexane, 2,2′-diaminodiethyl ether, 2,2′-diaminodiethyl sulphide, bis-(4-aminocyclohexyl) methane, N,N′-dimethyl-2,2,3, 3,4,4-hexafluoropentane-1,5-diamine, ortho-, meta-, or para-phenylene diamine, benzidine, xylylene diamine, m-toluylene diamine, ortho-tolidine, piperazine, diethylene triamine, triethylene tetramine, tetraethylene pentamine, 3,3'-imino-bispropyl amine, 6,6'-imino-bishexyl amine, pentaerythrityl amine, and the like. If desired, mixtures of the amines or imines may be used. It is generally preferred to use aliphatic alpha, omega diamines, particularly of the type

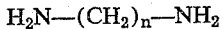
$$H_2N-(CH_2)_n-NH_2$$

wherein $n$ has a value of 2 to 12, preferably 6 to 10.

Another preferred class is compounds of the type

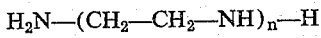
$$H_2N-(CH_2-CH_2-NH)_n-H$$

wherein $n$ is 2, 3, or 4.

*Component B.—(Fixative) containing OH groups*

Component B in this category may be any of the aromatic, aliphatic, or heterocyclic compounds containing at least two hydroxy groups. The compounds may be hydrocarbon polyols or may contain non-interfering (non-functional) radicals such as ether groups, thioether groups, sulphone groups, etc. Typical compounds in this category are listed below by way of illustration but not limitation:

ethylene glycol,
diethylene glycol,
2,2-dimethyl propane-1,3-diol,
propane-1,3-diol,
butane-1,4-diol,
hexane-1,6-diol,
octane-1,8-diol,
decane-1,10-diol,
dodecane-1,12-diol,
butane-1,2-diol,
hexane-1,2-diol,
1-0-methyl glycerol,
2-0-methyl glycerol,
cyclohexane-1,4-diol,
hydroquinone,
resorcinol,
catechol,
bis(parahydroxyphenyl) methane,
1,2-bis(parahydroxyphenyl) ethane,
2,2-bis(parahydroxyphenyl) propane,
2,2-bis(parahydroxyphenyl) butane,
4,4'-dihydroxybenzophenone,
naphthalene-1,5-diol,
biphenyl-4,4'-diol,
2,2-bis(3-methyl-4-hydroxyphenyl) propane,
2,2-bis(3-isopropyl-4-hydroxyphenyl) propane,
2,2-bis(4-hydroxy-dibromophenyl) propane,
glycerol,
diglycerol,
hexanetriol,
pentaerythritol, etc.

Moreover, it is within the spirit of the invention to utilize the sulphur analogues of the diols. Thus, for example, instead of using the compounds containing two hydroxy groups one can use the analogues containing either (a) two —SH groups or (b) one —SH group and one —OH group.

Among the preferred compounds are the aliphatic diols, for example, those of the type:

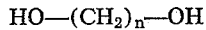
$$HO-(CH_2)_n-OH$$

wherein $n$ has a value from 2 to 12. Another preferred category of aliphatic compounds are the polyethylene glycols, i.e.:

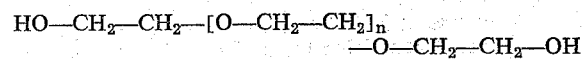
$$HO-CH_2-CH_2-[O-CH_2-CH_2]_n-O-CH_2-CH_2-OH$$

wherein $n$ has a value from zero to 10. A preferred category of aromatic diols are the bisphenols, that is, compounds of the type:

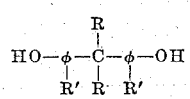

$$HO-\phi-\underset{\underset{R'}{|}}{\overset{\overset{R}{|}}{C}}-\phi-OH$$

wherein R—C—R represents an aliphatic hydrocarbon group containing 1 to 12 carbon atoms, and R' represents hydrogen or a lower alkyl radical. In this category especially preferred compounds are 2,2-bis(parahydroxyphenyl) propane, often designated as bisphenol-A; 2,2-bis(3-methyl-4-hydroxyphenyl) propane; 2,2-bis(3-isopropyl-4-hydroxyphenyl) propane; and brominated derivatives of bisphenol A, such as 2,2-bis(4-hydroxy-dibromophenyl) propane.

The hydroxy compounds are employed as such in the phase boundary-limited cross-linking or in the form of their alkali-metal salts, that is, as alcoholates or phenolates, depending on whether the polyols are aliphatic or aromatic.

*Component B.—(Fixative) containing —NCO groups*

Component B in this category may be any of the aliphatic, aromatic, or heterocyclic compounds containing at least two isocyanate (—NCO) groups. The compounds may be hydrocarbon isocyanates or may contain non-interfering (non-functional) radicals such as ether groups, thioether groups, sulphone groups, tertiary amine groups, etc. Typical examples of compounds in this category are listed below merely by way of illustration and not limitation: Ethylene diisocyanate, propylene diisocyanate, butylene diisocyanate, trimethylene diisocyanate, tetramethylene diisocyanate, hexamethylene diisocyanate, octamethylene diisocyanate, decamethylene diisocyanate, cyclohexylene diisocyanate, bis(2-isocyanatoethyl) ether, bis(2-isocyanatoethyl) ether of ethylene glycol, o-phenylene diisocyanate, m-phenylene diisocyanate, p-phenylene diisocyanate, tolylene-2,4-diisocyanate, tolylene-2,6-diisocyanate, 3,3'-bitolylene-4,4'-diisocyanate, diphenyl ether-4,4'-diisocyanate, 3,5,3',5' - bixylylene-4,4'-diisocyanate, diphenylmethane-4,4'-diisocyanate, biphenylene diisocyanate, 3,3'-dimethoxy-biphenylene - 4,4' - diisocyanate, naphthalene diisocyanates, polymethyl polyphenyl isocyanates, and reaction products of polyhydric alcohols with excess diisocyanate, for example, compounds of the formulae:

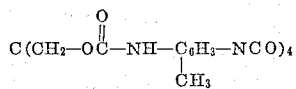
$$C(CH_2-O\overset{\overset{O}{\|}}{C}-NH-\underset{\underset{CH_3}{|}}{C_6H_3}-NCO)_4$$

and

$$\begin{array}{c} CH_2-Z \\ | \\ CH-Z \\ | \\ CH_2-Z \end{array}$$

wherein Z stands for the radical

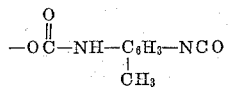
$$-O\overset{\overset{O}{\|}}{C}-NH-\underset{\underset{CH_3}{|}}{C_6H_3}-NCO$$

It is also evident that the sulphur analogues of these compounds may be used and such are included within the spirit of the invention. Thus for example, instead of using the compounds containing two —NCO groups one may use their analogues containing either two —NCS groups or one —NCO group and one —NCS group.

Among the preferred compounds are the aliphatic diisocyanates, for example, those of the type

$$OCN-(CH_2)_n-NCO$$

wherein $n$ has a value from 2 to 12. Other preferred compounds are the toluene diisocyanates, xylylene diisocyanates, and diphenylmethane-4,4'-diisocyanate which may also be termed methylene-bis(p-phenylisocyanate).

*Component B.—(Fixative) containing anhydride or imide groups*

Component B in this category may be any of the aliphatic, aromatic, or heterocyclic compounds containing at least two anhydride or imide groups. The compounds may be hydrocarbon anhydrides or imides or may contain non-interfering (non-functional) radicals such as ether groups, thioether groups, sulphone groups, tertiary amine groups, etc. Typical illustrative examples in this category are: 3,3',4,4'-benzophenone tetracarboxylic dianhydride or diimide, cyclopentanetetracarboxylic dianhydride or diimide, cyclohexanetetracarboxylic dianhydride or diimide, pyromellitic dianhydride or diimide, etc.

Procedure

As mentioned above, a feature of the present invention is that cross-linking of the pre-formed polymer takes place under phase boundary-limited reaction conditions. This means that Component A and Component B must be present on the fibrous substrate in separate phases so that the cross-linking reaction will take place at the boundary between the phases. This is, of course, a very desirable situation as under such conditions the cross-linking takes place almost instantaneously so that no after-treatment (curing) is required. The boundary may be between different types of phases—solid, liquid, or gaseous—with the proviso that at least one phase must be fluid, i.e., liquid or gaseous. Thus, the Component A may be present as a solid phase (e.g., applied in solution, followed by evaporation of solvent) and Component B as a liquid or gas phase. Where Component A is applied as a liquid phase, Component B is applied as a solid, liquid, or gas phase. Generally, a system of liquid-liquid phases is preferred, and particularly wherein the phases are mutually-insoluble whereby to preserve the boundary between the phases. Thus in a preferred embodiment of the invention, the selected Components A and B are formed into separate solutions, using solvents which are substantially mutually immiscible. Thus, for example, Component B is dissolved in water and Component A is dissolved in benzene, carbon tetrachloride, toluene, xylene, ethylene dichloride, chloroform, hexane, octane, petroleum ether or other petroleum distillate, or any other inert, water-immiscible solvent. The two solutions are then applied to the fibrous substrate serially; that is, the substrate is treated first with one solution, then with the other. The order of applying the solutions is not critical. Generally, the solution of Component B is applied first and the solution of Component A is applied next. However, the reverse order gives good results and it is within the ambit of the invention to apply the solutions in either sequence.

The solutions may be applied to the fibrous material in any way as long as they are applied serially. A preferred method involves immersing the material in one solution, removing excess liquid as by the use of squeeze rolls, immersing the material in the second solution, and again removing excess liquid. To remove unreacted materials, solvents, etc., the material may then be washed and/or rinsed. Then, after drying, it is ready for use or sale. Conventional apparatus consisting of tanks, padding rolls, squeeze rolls, and the like are generally used in applying the respective solutions. The amount of each component applied to the fibrous material may be varied by altering the residence time in the solutions, the pressure exerted by the squeeze rolls, and by varying the concentration of the active ingredients in the respective solutions. To decrease carry-over of the solvent from the first treating solution to the second solution, the fibrous substrate after its immersion in the first solution may be subjected to drying conditions such as exposure to a current of warm air to evaporate at least part of the solvent and hence concentrate the solution carried by the fibers.

As noted above, a critical factor in the preferred form of the invention is that the complementary agents—Component A and Component B—are serially applied to the textile dispersed in solvents which are substantially mutually immiscible. The nature of the solvents is of no consequence as long as they are essentially inert and possess the above-stated property of substantial immiscibility. Usually, volatile solvents are preferred as they may be removed from the treated textile by evaporation. However, non-volatile solvents can be used, in which case they may be removed from the product by extraction with suitable volatile solvents therefor or washed out with soap and water or detergent and water formulations. In some cases Component A is soluble in water and may thus be applied to the textile in aqueous solution. In such case the solvent for Component B may be any inert, essentially water-immiscible organic solvent. Typical illustrative examples thereof are benzene, toluene, xylene, carbon tetrachloride, ethylene dichloride, chloroform, hexane, octane, petroleum ether or other volatile petroleum fraction. Usually, however, Component A, because of its high molecular weight, is insoluble in water and is preferably applied in solution in a substantially water-immiscible organic solvent, such as any of those listed above. In such case, Component B would be applied in aqueous solution. It is, of course, obvious that many of the contemplated highly reactive groups will react with water (e.g., isocyanate, carbonyl halide, sulphonyl halide, carbamyl halide, haloformate, anhydride, and imide groups) and hence components which contain these are not normally applied in aqueous solutions.

Although one of the complementary solutions generally has water as a solvent, such a system is not essential and one may utilize a system of two essentially immiscible organic solvents, Component A being dispersed in one solvent and Component B in the other. As an example, Component A may be dispersed in 2 - bromoethyl acetate and Component B dispersed in benzene. Another example involves using formamide, dimethylformamide, or diethylformamide as the solvent for Component A and using n-hexyl ether as the solvent for Component B. A further example involves a system of adiponitrile as the solvent for Component A and ethyl ether as the solvent for Component B. Examples of other pairs of solvents which are substantially immiscible with one another and which may be used for preparing the solutions of the respective reactants are 2 - bromoethyl acetate and n-hexyl ether, ethylene glycol diacetate and n-hexyl ether, adiponitrile and n-butyl ether, adiponitrile and carbon tetrachloride, benzonitrile and formamide, n-butyl ether and formamide, di - N - propyl aniline and formamide, isoamyl sulphide and formamide, benzene and formamide, butyl acetate and formamide, benzene and nitromethane, n-butyl ether and nitromethane, carbon tetrachloride and formamide, dimethyl aniline and formamide, ethyl benzoate and formamide.

The concentration of active materials (Component A and Component B) in the respective solutions is not critical and may be varied widely. Generally, it is preferred that each of the pair of solutions contains about from 0.5 to 20% of the respective active component. In applying the process of the invention, enough of the respective solutions are applied to the fibrous substrate to provide a cross-linked polymer on the fibers in the amount desired. In treating some substrates such as textiles it is desired to limit the amount of cross-linked polymer to about 1 to 10% of the weight of the textile, whereby to achieved the desired modification—e.g., shrinkproofing—without damaging the hand of the textile.

It is often desirable to add reaction promoters or catalysts to either of the solutions of Components A or B in order to enhance reaction between the active agents. For example, in cases where the system involves reaction between (1) amine or hydroxy groups and (2) carbonyl chloride, sulphonyl chloride, carbamyl chloride, or chloroformate groups, it is desirable to add to the solution of the component containing the amine or hydroxy groups a sufficient amount of alkaline material to take up the HCl formed in the reaction. For such purpose one may use a tertiary amine such as pyridine, dimethyl aniline, or quinoline or an alkali-metal hydroxide, or, more preferably, an alkaline material with buffering capacity such as sodium carbonate, sodium bicarbonate, trisodium phosphate, borax, sodium metasilicate, etc. Another plan which may be used in instances where one component contains amino groups, involves supplying said component in excess so that it will act both as a reagent and as an HCl-acceptor. The reaction of Components A and B may also be catalyzed by addition of such agents as tributyl tin chloride, stannous tartrate, ferric chloride, titanium tetrachloride, boron trifluoride - diethyl ether complex, or tin salts of fat acids such as tin laurate, myristate, etc. Such catalysts are particularly useful to promote reaction between components containing hydroxy groups and those containing isocyanate, acid chloride, or chloroformate groups.

Where one of the solutions of the reactants contains water as the solvent, it is often desirable to incorporate a minor proportion of a surface-active agent to aid in dispersing the reactant and to assist in penetration of the solution into the textile. For this purpose one may use such agents as sodium alkyl ($C_8$-$C_{18}$) sulphates, the sodium alkane ($C_8$-$C_{18}$) sulphonates, the sodium alkyl ($C_8$-$C_{20}$) benzene sulphonates, esters of sulphosuccinic acid such as sodium dioctylsulphosuccinate, and soaps, typically sodium salts of fat acids. Emulsifying agents of the non-ionic type are suitable, for example, the reaction products of ethylene oxide with fatty acids, with polyhydric alcohols, with partial esters of fatty acids and polyhydric alcohols or with alkyl phenols, etc. Typical of such agents are a polyoxyethylene stearate containing about 20 oxyethylene groups per mole, a polyoxyethylene ether of sorbitan monolaurate containing about 16 oxyethylene groups per mole, a distearate of polyoxyethylene ether of sorbitol containing about 40 oxyethylene groups per mole, iso-octyl phenyl ether of polyethylene glycol, etc. Generally, only a small proportion of surface-active agent, is used, on the order of 0.05 to 0.5%, based on the weight of the solution. In addition to, or in place of the surface-active agent, a supplementary solvent may be added to the primary solvent (water) in quantity sufficient to disperse the active reactant. For such purpose one may employ acetone, or other inert, volatile solvent, particularly one that is at least partially miscible with water. It is evident that the solutions of Components A and B need not necessarily be true solutions; they may be colloidal solutions, emulsions, or suspensions, all these being considered as solutions for the purposes of the present invention.

Ordinarily, the treatment of the fibrous substrate with the solutions of the complementary agents is carried out at room temperature as at such temperature the cross-linking takes place very rapidly, that is, in a matter of a minute or less. If, however, a higher rate of cross-linking is desired—as in continuous operation on long lengths of cloth—the second solution may be kept hot, for example, at a temperature of 50 to 150° C. Also, where the agents used include a polyol as such (in contrast to the alkali salt thereof) it is preferable to heat the second solution as the cross-linking rates with the polyols are generally unsatisfactory at room temperature.

As has been explained above, in the preferred modification of the invention the solutions of Components A and B are serially applied to the fibrous material in the form of mutually-immiscible solutions to provide a liquid-liquid interface between the solutions as they are serially laid onto the fibers. In a less preferred modification of the invention, a system is used which utilizes a solid-liquid interface. Such a system is established in the following way: The fibrous material is first impregnated with a solution of one of the complementary agents—for example, Component A—dispersed in an inert, volatile solvent. The substrate is then subjected to drying as by exposing it to a current of hot air. The fibers which are now covered with a deposit of the first component in a solid state, are then impregnated with the complementary agent—Component B, in this case, dispersed in an inert, preferably volatile solvent. In this way the fibers are layered with a superposed system of solid Component A and a solution of Component B. Under these conditions cross-linking takes place rapidly, forming the three-dimensional polymer in situ on the fibers. In this system it is not essential that the respective solvents be immiscible. Thus, for example, Component A may be applied in water solution and Component B in a water-miscible solvent such as dioxane or acetone. This and other phases not involving liquid-liquid boundary cross-linking are described in some of the examples below, e.g., Example I, runs 2 and 4.

In a preferred embodiment, the invention is applied to wool as the fibrous substrate whereby to attain such desirable results as increasing the resistance of the textile to shrinking and felting when subjected to washing operations, increasing the resistance of the textile to becoming soiled in use, enhancing resistance to bleaches and to light, decreasing the tendency of the textile to becoming creased or wrinkled during wear or during washing and drying operations, i.e., to provide it with "easy-case" properties so that ironing after laundering is largely eliminated. Moreover, these desirable effects are attained without impairing such desirable properties as tensile strength, abrasion resistance, elasticity, porosity, and hand of the material so that textiles modified in accordance with the invention may be used in fabricating garments of all kinds. The invention may be applied to wool in any physical form, for example, bulk fibers, top, sliver, roving, webbing, yarn, felt, woven textiles, knitted textiles, completed garments or garment parts, and other fabricated forms such as carpets, rugs, blankets, cords, tapes, etc. As noted hereinabove, the permanence of modification obtained in accordance with the invention is primarily based on converting the pre-formed polymer into an insoluble, cross-linked (3-dimensional) structure. However, it is evident that in treating wool in accordance with the invention, one may additionally obtain a chemical combination of the polymer with the wool in such cases where the pre-formed polymer and/or the fixative contains groups capable of reacting with reactive sites on the wool molecules. Since such reactive sites are primarily of an amine or hydroxy nature, it is believed that chemical combination (grafting) occurs in such instances where the agents applied (Components A or B) contains such reactive groups as carbonyl halide, haloformate, sulphonyl halide, carbamyl halide, isocyanate, etc.

Although the invention is of particular advantage in its application to wool, this is by no means the only type of fiber which comes into the ambit of the invention. Generically, the invention is applicable to the treatment of any type of fibrous material, for example, animal hides and leather; silk, animal hair, mohair; cotton; sisal; hemp; jute; ramie; flax; wood; paper; synthetic cellulosic fibers such as viscose, cellulose acetate, cellulose acetate-butyrate, saponified cellulose acetate, cupra-ammonium rayons, ethyl cellulose; polyvinyl alcohol-protein fibers; algin and pectin fibers; glass fibers; asbestos; organic non-cellulose fibers such as polyethylene terephthalate, polyacrylonitrile, polyethylene, polypropylene, polyvinyl chloride, polyvinylidene chloride, nylon, polyurethanes; regenerated protein fibers such as those prepared from casein, soybeans, peanut protein, zein, gluten, egg albumin, collagen, or keratins such as animal hoof or horn; mixtures of any of the above such as textiles containing cellulosic and non-cellulosic fibers, blends of synthetic fibers or cotton with wool, etc. The invention may be applied to such fibrous materials in any state such as bulk fibers, staple fibers, slivers, yarns, woven or knitted textiles, felts, fabricated articles such as garments and garment parts. The application of the invention may be for the purpose of obtaining any of a wide variety of functional or decorative effects such as sizing, increasing gloss or transparency, increasing water-, oil-, or soil-repellency, increasing adhesion or bonding characteristics of the substrates with rubber or other elastomers, imparting softness or lubricity, imparting shrinkage resistance, decreasing tendency to wrinkle, crease and pill during wear or during washing and drying operations, etc. In cases where the fibrous material is a hydrogen-donor (that is, where its molecules contain active hydrogen as in amine or hydroxy groups), it would be expected that during application of the process of the invention, a chemical combination of the polymer to the fiber molecules will take place, particularly where either the preformed polymer or the fixative contains such highly reactive groups as carbonyl halide, sulphonyl halide, carbamyl halide, haloformate, or isocyanate. Typical examples of hydrogen donor fibers (in addition to wool) are the natural cellulosic fibers, viscose rayons, saponified cellulose acetate fibers, etc.

Having now described the types of compounds which may be used as Components A and B and how they are applied to fibrous materials, we will next explain the various preferred embodiments of the invention. In the procedure of the invention, the type of pre-formed polymer employed is the determinative factor because of the large molecular weight thereof in comparison to that of the fixative or the cross-linking units derived therefrom. Accordingly, the various sub-generic embodiments of the invention are based on the type of pre-formed polymer, i.e., Component A.

Embodiment 1

In this preferred embodiment of the invention, Component A is an addition polymer. Numerous examples thereof are listed hereinabove in the sections entitled "Component A (Addition Polymers)" and "Component A (Converted Addition Polymers)." Among the special advantages of addition polymers for use as Component A are stability to oxidation and light, good film-forming ability, availability of a wide spectrum of types and individual species, and the fact that many are relatively inexpensive compared to other classes of polymers.

In the preferred practice in accordance with this embodiment of the invention, Component A is an addition polymer containing (as the highly reactive groups) carbonyl halide, sulphonyl halide, haloformate, isocyanate, carbamyl halide, or anhydride groups and is applied to the fibrous substrate in the form of a solution in an inert, essentially water-immiscible solvent. The complementary fixative (Component B) is accordingly applied as an aqueous solution and contains hydroxy groups, or, more preferably, amine or imine groups as the highly reactive groups complementary to those on Component A. Thus in operating in the sphere of the preferred modification of this embodiment, Component B may be chosen from any of the types exemplified above in the section entitled "Component B (Fixative) Containing $NH_2$ or NH Groups."

Coming under special consideration is the use, as Component A, of copolymers of (a) methacryloyl chloride or acryloyl chloride (to provide free COCl groups) with (b) other polymerizable unsaturated monomers free from highly reactive groups, typically such monomers as olefines, esters of acrylic or methacrylic acid, vinyl esters and ethers, vinyl chloride, etc.

Especially useful are the copolymers containing units derived from (1) acryloyl or methacryloyl chloride and (2) from an olefine such as ethylene, propylene, isobutylene, or butadiene. Usually, a third type of unit is included to decrease crystallinity and to increase solubility. For these purposes, the copolymer may contain units derived from (3) esters of acrylic or methacrylic acid, vinyl esters of fatty acids, vinyl ethers, vinyl chloride, or the like. These copolymers may be directly prepared from the monomers. More usually, acrylic or methacrylic acid is copolymerized with the olefine and the third type of monomer and the product is treated to convert the free acid groups to carbonyl chloride groups. Thus although not made directly, the final product can still be considered as a copolymer of acryloyl or methacryloyl chloride with the olefine and the third type of monomer. A typical formulation for this type of copolymer would be, for example, 1 to 10 mole percent of methacryloyl chloride, 5 to 10 mole percent of vinyl acetate, or the like, and the remainder (to 100 mole percent) of the olefine.

Thus embodiment 1 of the invention is further demonstrated by the following illustrative examples:

EXAMPLES

*Accelerotor shrinkage test.*—This test for shrinkage was conducted in the following way: The wool samples were milled at 1700 r.p.m. for 2 minutes at 40–42° C. in an Accelerotor with 0.5% sodium oleate solution, using a liquor-to-wool ratio of 50 to 1. After this washing operation the samples were measured to determine their area and the shrinkage was calculated from the original area. The Accelerotor is described in the American Dyestuff Reporter, vol. 45, p. 685, Sept. 10, 1956. The two-minute wash in this device is equal to about 15 home launderings.

*Washing machine shrinkage test.*—The wool samples were washed in a reversing agitator-type household washing machine, using a 3-lb. load, a water temperature of 105° F., and a low-sudsing detergent in a concentration of 0.1% in the wash liquor. The wash cycle itself was for 75 minutes, followed by the usual rinses and spin drying. In most cases this washing program was repeated several times. The damp material was then tumble-dried in a household-type clothes dryer. The samples were then measured to determine their length and width and the shrinkage calculated from the original dimensions.

*Oil repellency test.*—The 3M oil repellency test described by Grajeck and Petersen, Textile Research Journal, 32, pp. 320–331, 1962. Ratings are from 0 to 150, with the higher values signifying the greater resistance to oil penetration.

*Water repellency.*—AATC spray test, method 22–1952. Ratings are from 0 to 100 with the higher values signifying greater resistance to water penetration.

EXAMPLE I (1) *Solution A.*—Component A was a terpolymer of ethylene (80%), vinyl acetate (15%), and methacryloyl chloride (5%). Its molecular weight was about 40,000 and it contained about 40–50 carbonyl chloride groups per polymer molecule. Solutions were made of this terpolymer in methyl chloroform at concentrations of 3% and 1.5%.

(2) *Solution B.*—0.5 percent hexamethylene diamine (Component B), 1% sodium carbonate, and 0.05% wetting agent (isooctylphenyl ether of polyethylene glycol) in water.

(3) A sample of wool cloth was immersed in one solution at room temperature for about 30 seconds, run through squeeze rolls to remove excess liquid, immersed for about 30 seconds in the complementary solution at room temperature, run through squeeze rolls to remove excess liquid, rinsed in water, and dried in air at room temperature.

(4) The sequence of treatment with the respective solutions and the results of shrinkage tests on the products are tabulated below:

| Run | Order of applying solutions | Conc. of terpolymer in Sol. A, percent | Area shrinkage (Accelerotor), percent |
|---|---|---|---|
| 1 | B–A | 3 | 8.8 |
| 2 | B*–A | 3 | 4.9 |
| 3 | B–A | 1.5 | 6.9 |
| 4 | B*–A | 1.5 | 4.9 |
| 5 | A–B | 3 | 3.0 |
| Control (Untreated wool) | | | 29.0 |

*In these cases, the cloth, after application of solution B, was air dried prior to immersion in solution A.

EXAMPLE II

*Solution A.*—The same terpolymer as in Example I was dissolved in methyl chloroform at concentrations of 3%, 1%, and 0.5%.

*Solution B.*—0.5 percent ethylene diamine (Component B), 1% sodium carbonate, and 0.05% wetting agent (isooctylphenyl ether of polyethylene glycol) in water.

Wool cloth was treated with the solutions as in Example I, part 3.

The sequence of treatment with the respective solutions and the results obtained are as follows:

| Run | Order of applying solutions | Conc. of terpolymer in Sol. A, Percent | Percent Area shrinkage, cumulative* | | | |
|---|---|---|---|---|---|---|
| | | | Wash 1 | Wash 2 | Wash 3 | Wash 4 |
| 1 | A-B | 3 | 0.2 | 0.5 | 0.3 | 0.5 |
| 2 | A-B | 1 | 0.2 | 0.9 | 0.4 | 1.0 |
| 3 | A-B | 0.5 | 1.0 | 3.5 | 4.7 | 9.4 |
| 4 | B-A | 3 | 0.3 | 1.5 | 0.5 | 0.5 |
| Control | | | 19.1 | 30.5 | 35.5 | 39.5 |

*Successive 75-minute washes in automatic home washing machine, agitator type. See text above for details of wash method.

The products of runs 1, 2, and 3 were subjected to tests for abrasion resistance, using a Stoll flex abrader, ASTM D1175–5ST. The results are as follows:

| Run | Wt. resin on fabric, percent | Abrasive resistance, cycles to break | |
|---|---|---|---|
| | | Warp | Fill |
| 1 | 3 | 810 | 767 |
| 2 | 1 | 716 | 969 |
| 3 | 0.5 | 550 | 588 |
| Control (Untreated) | 0 | 457 | 547 |

The products of runs 1, 2, and 3 were tested for their coefficient of friction by drawing individual fibers over a glass rod in the direction against the scales. In this test a smaller value indicates a smoother fiber surface. The results are given below:

| Run | Wt. resin on fabric, percent | Friction coefficient (against scales) |
|---|---|---|
| 1 | 3 | .152 |
| 2 | 1 | .174 |
| 3 | 0.5 | .214 |
| Control (Untreated) | 0 | .230 |

EXAMPLE III

*Solution A.*—The same terpolymer as in Example I was dissolved at a concentration of 1.5% in a petroleum solvent (a commercial hydrocarbon mixture having the following characteristics: 96% aromatics, 3% naphthenes, 1% paraffins, Sp.G. 0.87, boiling range 314–362° F.).

*Solution B.*—Contained 0.5% of a specific diamine (as given below), 1% sodium carbonate, and 0.05% of wetting agent (isooctylphenyl ether of polyethylene glycol) in aqueous solution. The various diamines used are listed below:

Diamine: Abbreviation
    Ethylene diamine _____ EDA
    1,3-diaminopropane _____ DPA
    Propylene diamine _____ PDA
    Hexamethylene diamine _____ HMDA
    Piperazine _____ Pip Wool cloth was treated with the solutions as in Example I, part 3. In all cases the sequence of treatment was B-A. The results are given below:

| Run | Component B used | Percent Area shrinkage, cumulative* | | | |
|---|---|---|---|---|---|
| | | Wash 1 | Wash 2 | Wash 3 | Wash 4 |
| 1 | EDA | 0.9 | 1.1 | 2.0 | 1.2 |
| 2 | DPA | 0.8 | 2.5 | 3.4 | 3.1 |
| 3 | PDA | 1.5 | 1.9 | 2.8 | 2.5 |
| 4 | HMDA | 1.0 | 0.1 | 0 | 0.5 |
| 5 | Pip | 2.8 | 9.1 | 15.5 | 21.9 |
| Control | | 19.1 | 30.5 | 35.4 | 39.5 |

*Successive 75-minute washes in automatic home washing machine, as described above.

EXAMPLE IV

*Solution A.*—The same terpolymer as in Example I was dissolved in methyl chloroform (or Stoddard solvent) at a concentration of 1.5%.

*Solution B.*—Same as in Example III.

Wool cloth was treated with the solutions as in Example I, part 3. In all cases, the sequence of treatment was B-A. The results are given below:

| Run | Solvent for Component A | Component B used | Percent Area shrinkage, cumulative* | | | |
|---|---|---|---|---|---|---|
| | | | Wash 1 | Wash 2 | Wash 3 | Wash 4 |
| 1 | Methyl chloroform | EDA | 1.3 | 2.0 | 3.0 | 1.3 |
| 2 | do | DPA | 0.7 | 2.5 | 3.2 | 3.5 |
| 3 | do | PDA | 1.0 | 1.9 | 2.5 | 2.2 |
| 4 | do | HMDA | 0.2 | 0.5 | 0.2 | 0 |
| 5 | do | Pip | 1.2 | 1.5 | 2.7 | 2.2 |
| 6 | Stoddard solvent | EDA | 0 | 0 | 0 | 0.7 |
| 7 | do | HMDA | 0.8 | 0.6 | 0.3 | 0.7 |
| Control | | | 18.8 | 30.5 | 36.4 | 39.5 |

*Successive 75-minute washes in automatic home washing machine, as described above.

EXAMPLE V

A solution of 95 ml. styrene, 5 ml. methacryloyl chloride, and 1000 ml. of benzene, containing 0.2 g. azo-bis-isobutyronitrile, was swept with dry nitrogen for 30 minutes and then heated to 70–80° in a closed vessel for 8 hours. The resulting solution of the styrene-methacryloyl chloride copolymer (containing more than 3 carbonyl chloride groups per molecule) was used to treat test swatches of wool as in Example I, part 3. Various aqueous solutions of diamines were used in the first treatment step; these diamine solutions contained 0.5% of the specified diamine, 1.0% sodium carbonate, and 0.1% wetting agent. Abbreviations for diamines are given in Example III.

| Step 1 | Step 2 | Percent Area shrinkage, Accelerotor |
|---|---|---|
| Diamine used: | | |
|   EDA | Copolymer Soln | 16.3 |
|   HMDA | do | 15.4 |
|   DPA | do | 19.0 |
|   PDA | do | 18.1 |
|   Pip | do | 19.9 |
| Control (Untreated) | | 30.0 |

EXAMPLE VI

A copolymer of methyl methacrylate and methacryloyl chloride (containing over 3 carbonyl chloride groups per copolymer molecule) was prepared as follows: 95 ml. of methyl methacrylate (redistd.) and 5 ml. of methacryloyl chloride were placed in 500 ml. of dry benzene. The system was flushed with dry nitrogen, 0.1 g. azo-bis-isobutyronitrile added, and heated at 70–80 degrees C. for 6 hours while held in a closed vessel.

The resulting copolymer solution was used to treat test swatches of wool (14 inch by 14 inch): The test piece was first immersed in a solution, at room temperature, of 0.5% ethylene diamine in $H_2O$ (containing 1.0% sodium carbonate and 0.1% wetting agent), then passed through squeeze rolls to give a wet pickup of about 60%. The swatch was then immersed in the copolymer solution, at room temperature, and again passed through the squeeze rolls, followed by a light 15-minute wash in 0.1% detergent solution, and finally dried at room temperature. The treated material shrank only 12% in a 75-minute wash in home washing machine, compared to 22% shrinkage by an untreated swatch.

EXAMPLE VII

A copolymer of lauryl methacrylate and methacryloyl chloride (in 95/5 mole ratio) was prepared by a standard bulk polymerization technique—i.e., heating in a closed vessel at 80° for 5 hours in the presence of a minor proportion of $\alpha,\alpha'$-azodiisobutyronitrile as a polymerization initiator. The copolymer contained three or more carbonyl chloride groups per molecule.

*Solution A.*—The copolymer above was dissolved in toluene at a concentration of 5% and 2.5%.

*Solution B.*—Four percent ethylene diamine, 7% sodium carbonate, and 0.01% wetting agent (isooctylphenyl ether of polyethylene glycol) in water.

Wool cloth was treated with the above solutions as in Example I, part 3, applying the solutions in the order B–A. In a control run, impregnation in Solution B was omitted.

The products were tested for shrinkage and also for permanence of the copolymer deposit by extraction with benzene for 2½ hours in a Soxhlet extractor. The results are tabulated below:

| Procedure | Conc. of copolymer in Sol. A, Percent | Weight of polymer on fabric percent | | Percent Area shrinkage, cumulative [1] | |
|---|---|---|---|---|---|
| | | Before extraction | After extraction | Wash 1 | Wash 2 |
| In accordance with invention | 5 | 2.2 | 1.5 | [2] 0 | [2] 3.0 |
| Do | 2.5 | 1.5 | ND | [3] 3.4 | [3] 9.0 |
| Control (No treatment with Sol. B) | 5 | 5.2 | 0.2 | [2] 7.0 | [2] 13.0 |
| Blank | | | | 10.0 | 20.0 |

[1] Successive 75-minute washes in automatic home washing machine, as described above
[2] Shrinkage tested after extraction.
[3] Shrinkage tested before extraction.
ND=not determined.

EXAMPLE VIII

Treatment of wool with a terpolymer containing styrene, lauryl methacrylate and methacryloyl chloride, the terpolymer containing three or more carbonyl chloride groups per molecule.

The terpolymer was prepared, using the following recipe:

52 ml. styrene
30 ml. lauryl methacrylate
10 ml. methacryloyl chloride
900 ml. benzene
0.2 g. azo-bis-isobutyronitrile.

The system was swept free of air by sweeping with dry nitrogen and was kept under a nitrogen atmosphere during 10 hours of heating in a closed vessel at 70–80° C.

The resulting terpolymer solution was used to treat wool swatches: The test swatches were first dipped in a 0.5% aqueous solution of a diamine, passed through a squeeze roll, then immersed in the terpolymer solution, again passed through the squeeze roll, and finally given a light wash in 0.1% detergent solution and dried at room temperature. The following results were obtained when the swatches were washed in an accelerated shrinkage test, using the Accelerotor:

| Step 1 | Step 2 | Area shrinkage, percent |
|---|---|---|
| HMDA | Terpolymer soln | 12.6 |
| EDA | do | 5.0 |
| Control (Untreated) | | 30.0 |

EXAMPLE IX 1,1-dihydroperfluorooctyl acrylate (9 moles), methacryloyl chloride (1 mole), and $\alpha,\alpha'$-azodiisobutyronitrile (about 5 g.) as a polymerization initiator were heated together at 78° C. for 3 to 4 hours in a closed vessel. The resulting copolymer containing three or more pendant —COCl groups per molecule was a tacky, solid resin.

*Solution A.*—The above polymer was dissolved in 1,3-bis(trifluoromethyl) benzene at a concentration of 3%.

*Solution B.*—Two percent hexamethylene diamine, 2% sodium carbonate, and 0.01% wetting agent (isooctylphenyl ether of polyethylene glycol) in water.

Wool cloth was treated with these solutions as in Example I, part 3, applying the solutions in the order B–A. In a control run, impregnation in Solution B was omitted. Increase in weight in both cases was 1%. The products were tested for oil and water repellency as prepared and after extraction with benzotrifluoride for 6 hours in a Soxhlet extractor. The results are given below:

| Procedure | Oil repellency | | Water repellency | |
|---|---|---|---|---|
| | Before extraction | After extraction | Before extraction | After extraction |
| In accordance with invention | 110 | 110 | 90 | 90 |
| Control (No treatment with Sol. B) | 120 | 0 | 100 | 50–60 |
| Blank (Untreated) | 0 | 0 | 50–60 | 50–60 |

EXAMPLE X

The chloroformate of ethylene glycol methacrylate

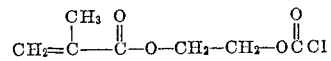

was prepared in 95% overall yield by reaction of ethylene glycol monomethacrylate with excess phosgene. The chloroformate was purified by distillation, B.P. 85° C. at 3 mm.

The chloroformate was copolymerized with lauryl methacrylate to produce a copolymer containing at least 3 chloroformate groups per molecule, using the following technique:

Lauryl methacrylate (15 g.), 5 g. of the chloroformate, 100 ml. dry benzene, and 200 mg. $\alpha,\alpha'$-azodiisobutyronitrile were heated a closed vessel at 79° C. for 18 hours.

*Solution A.*—The copolymer solution prepared as given above.

*Solution B.*—Three percent hexamethylene diamine and 0.01% wetting agent (isooctylphenyl ether of polyethylene glycol) in water.

Wool cloth was treated with the above solution as in Example I, part 3, applying the solutions in the order B-A. In a control run, impregnation with Solution B was omitted.

The products were tested for shrinkage before and after an extraction with chloroform—20 hours in a Soxhlet extractor. The results are given below:

| Procedure | Approx. wt. of resin on fabric, percent | Percent Area shrinkage, Accelerotor | |
|---|---|---|---|
| | | Before extraction | After extraction |
| In accordance with invention | 15 | 2 | 5 |
| Control (No treatment with Sol. B) | 15 | 0 | 12.6 |
| Blank (No treatment) | | 30 | |

EXAMPLE XI

*Solution A.*—Component A was a 1/1 copolymer of methyl vinyl ether and maleic anhydride having a specific viscosity of 1.0 to 1.4 (as 1% solution in methyl-ethyl ketone at 25° C.). The repeating unit of this copolymer had the structure $$-CH_2-CH-CH-CH- \\ \quad\quad | \quad\quad | \quad\quad | \\ \quad OCH_3 \quad O=C \quad C=O \\ \quad\quad\quad\quad\quad \backslash O /$$

It was dissolved in ethyl acetate at concentrations of 3, 1.5, and 0.7%.

*Solution B.*—Two percent hexamethylene diamine, 3% sodium carbonate, and 0.01% wetting agent (isooctylphenyl ether of polyethylene glycol) in water.

Wool cloth was treated with the above solutions as in Example I, part 3, using the sequence B–A.

Tests for permanency of the finish were conducted by measuring loss in weight after extraction for 6 hours with acetone. The product retained 95% of the resin deposit in this test. In a control test wherein treatment with Solution B (the fixative) was omitted, the cloth retained only 24% of the copolymer deposit.

In other runs, wool cloth was immersed in an acetone solution of the copolymer, squeezed to remove excess liquid, air dried to evaporate the acetone, immersed in an aqueous solution of 4% hexamethylene diamine, 7% sodium carbonate, and 0.01% wetting agent (isooctylphenyl ether of polyethylene glycol), then rinsed in water and air-dried.

The product was extracted with acetone for 6 hours and it was found that the product retained 93% of the resin deposit.

EXAMPLE XII

*Solution A.*—Component A was chlorosulphonated polyethylene of number average molecular weight about 30,000 and of the formula $$\left[ \left( CH_2-CH_2-CH_2-CH-CH_2-CH_2-CH_2 \right)_x - CH - \right]_n \\ \quad\quad\quad\quad\quad\quad\quad\quad | \quad\quad\quad\quad\quad\quad\quad\quad\quad | \\ \quad\quad\quad\quad\quad\quad\quad\quad Cl \quad\quad\quad\quad\quad\quad\quad\quad\quad SO_2Cl$$

wherein $n$ is approximately 17 and $x$ is approximately 12. It was dissolved in benzene at a concentration of 1.5%.

*Solution B.*—0.5 percent of hexamethylene diamine (HMDA) or ethylene diamine (EDA), 1% sodium carbonate, 0.05% of wetting agent (isooctylphenyl ether of polyethyleneglycol) in water.

Wool cloth was treated with these solutions as in Example I, part 3, applying the solutions in the order B (room temperature, immersion time 1 min.)–A (60° C., immersion time 2 min.). The results are given below:

| Run | Component B used | Percent Area shrinkage, cumulative* | | | |
|---|---|---|---|---|---|
| | | Wash 1 | Wash 2 | Wash 3 | Wash 4 |
| 1 | HMDA | 0.3 | 1.9 | 3.7 | 5.0 |
| 2 | EDA | 0.5 | 3.9 | 6.7 | 11.5 |
| Control | | 19.1 | 30.5 | 35.4 | 39.5 |

*Successive 75-minute washes in automatic home washing machine, as described above.

EXAMPLE XIII

Wool cloth was immersed in a solution containing 10% ethylene diamine in acetone. The cloth was squeezed to remove excess liquid and air-dried to remove the solvent. It was then immersed in a 5% solution of the chlorosulphonated polyethylene (as in Example XII) for 2 minutes, squeezed and air-dried.

A piece of the treated cloth and a control (untreated) piece were placed in 5% sodium hypochlorite solution in water and observed to ascertain dissolution time of each. The results are given below:

| Elapsed time | Untreated cloth (control) | Treated cloth |
|---|---|---|
| 10 | Vigorous evolution of bubbles. | No evidence of attack. |
| 20 | Mostly dissolved | Do. |
| 120 | Completely dissolved | Still essentially whole; attack at edges. |

EXAMPLE XIV

A copolymer of methacryloxymethyl pentamethyldisiloxane—

$$CH_3-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-O-\overset{\overset{O}{\|}}{C}-\underset{\underset{CH_3}{|}}{C}=CH_2$$

and the chloroformate of monoethylene glycol methacrylate $$CH_2=\underset{\underset{CH_3}{|}}{C}-\overset{\overset{O}{\|}}{C}-O-CH_2-CH_2-OCOCl$$

was prepared by heating the following ingredients in a closed vessel at 75° C. for 10 hours:

1.5 grams of the siloxane compound as above
0.8 gram of the chloroformate compound as above
15 cc. dry toluene (diluent)
0.1 gram α,α'-azobisisobutyronitrile (polymerization initiator).

The viscous syrup resulting was diluted with additional toluene to 3% and 6% concentrations and used as Solution A.

Solution B was a 5% solution of hexamethylene diamine and about 0.01% non-ionic wetting agent in water.

Wool cloth was treated with the solutions as in Example I, part 3, using the sequence B–A. The results of tests on the products are given below:

| Wt. resin on fabric, percent | Water repellency | | | Area shrinkage (Accelerotor, after extraction*), percent |
|---|---|---|---|---|
| | Before extraction | After extraction* | After Accelerotor wash | |
| 6 | 80 | 100 | 100 | 11.6 |
| 3 | 80 | 100 | 100 | 16.3 |
| Control (Untreated) | 50 | | | 27.0 |

*Extraction was with benzene, 3 hours in a Soxhlet extractor.

Embodiment 2

In accordance with this embodiment of the invention, Component A is a polyalkylene imine. Typical examples of such polymers are exemplified above in the section entitled "Component A (Polyalkylene Imines)." A special feature of these polymers is that they contain built-in highly reactive groups on the polymer backbone, namely, —NH— groups. In addition, they contain terminal NH₂ groups. Another feature is that they are soluble in water even at very high molecular weights, e.g., 10,000 and above. Accordingly, they may advantageously be applied to the fibrous material in the form of an aqueous solution. The fixative (Component B) in such case is then preferably applied as a solution in an inert, substantially water-immiscible solvent. Component B is preferably chosen to provide isocyanate radicals as the complementary, highly reactive groups. Other fixatives which provide excellent results are those containing carbonyl halide, haloformate, or anhydride groups. Thus the preferred types of compounds for use as the fixative may be selected from those exemplified above in the sections pertaining to Component B of the types containing NCO, COX, OCOX, or anhydride groups.

This Embodiment 2 of the invention is further demonstrated by the following illustrative examples:

EXAMPLE XV

Component A was a polyethylene imine of molecular weight about 30,000–40,000. Basically, this polymer had the structure

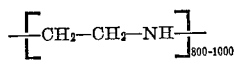

*Solution A.*—Aqueous solution of the above polyethylene imine (concentration as given below) plus ca. 0.01% non-ionic wetting agent.

*Solution B.*—Benzene solution containing 4% of toluene diisocyanate (TDI) or sebacoyl chloride (SC).

Wool cloth was treated with the above solutions as described in Example I, part 3.

The particulars of the treatment, amount of resin deposited on the fabric, and shrinkage tests are given below:

| Order of treatment | Conc. of Component A in Sol. A, percent | Component B | Wt. resin on fabric, percent | Percent area shrinkage, cumulative* | | |
|---|---|---|---|---|---|---|
| | | | | Wash 1 | Wash 3 | Wash 5 |
| B-A | 3 | TDI | 2.3 | 0 | 0 | 0 |
| A-B | 4 | TDI | 3.6 | 0 | 1.0 | 2.0 |
| A-B | 1 | TDI | 1.0 | 0 | 1.0 | 1.0 |
| A-B | 0.5 | TDI | 0.45 | 0 | 1.0 | 2.0 |
| A-B | 0.25 | TDI | 0.22 | 0 | 1.0 | 1.5 |
| A-B | 3 | SC | 2.9 | 0 | 1.0 | 2.0 |
| B-A | 3 | SC | 2.8 | 0 | 1.0 | 2.0 |
| A-B | 2 | SC | 1.4 | 0 | 1.0 | 3.0 |
| Control (A only) | 10 | None | 9.6 | 3.0 | 13.5 | 20.0 |
| Blank | None | None | None | 9.0 | 26.0 | 33.4 |

*Successive 75-minute washes in automatic home washing machine, agitator type, as described above.

Several of the products as prepared above were subjected to extraction with acetone for 3 hours in a Soxhlet extractor to test the permanence of the cross-linked resin deposits. Also, shrinkage tests were determined after such extraction. The results are tabulated below:

| Order of treatment | Conc. of Component A in Sol. A, percent | Component B | Wt. of resin on fabric, percent | | Area shrinkage (Accelerotor, after extraction), percent |
|---|---|---|---|---|---|
| | | | Before extraction | After extraction | |
| B-A | 3 | TDI | 2.3 | 1.7 | 0 |
| A-B | 4 | TDI | 3.6 | 3.2 | 2.0 |
| A-B | 3 | SC | 2.9 | 2.3 | 2.0 |
| B-A | 3 | SC | 2.8 | 2.2 | 2.0 |
| Control (A only) | 10 | None | 9.6 | 2.6 | 10.0 |
| Blank | None | None | | | 27.0 |

EXAMPLE XVI

*Solution A.*—Aqueous solution of the polyethylene imine described in Example XV (concentration given below) plus ca. 0.01% non-ionic wetting agent.

*Solution B.*—Acetone solution containing 4% pyromellitic dianhydride.

Wool swatches were treated in the following manner: The swatches were wet-out in Solution B, passed through a squeeze roll to obtain about a 90% wet pick-up, and air dried at room temperature for about 20 minutes to remove the acetone solvent. The dried swatches were then immersed in Solution A at room temperature for one minute, passed through a squeeze roll to 90% wet pick-up, washed to remove unreacted materials, and air dried.

The various products were tested for permanence of the resin deposit by extraction with acetone for 3 hours in a Soxhlet extractor. Shrinkage was also tested after extraction. The results are given below:

| Conc. of Component A in Sol. A | Wt. of resin on fabric, percent | | Area shrinkage (Accelerotor, after extraction), Percent |
|---|---|---|---|
| | Before extraction | After extraction | |
| 3 | 2.5 | 1.6 | 9.7 |
| 4 | 3.7 | 1.6 | 7.8 |
| Blank | | | 27.0 |

EXAMPLE XVII

Wool swatches were immersed in an aqueous solution containing 3.3% of polyethylene imine (as described in Ex. XV) and passed through squeeze rolls to a 100% wet pick-up. The swatches were air-dried at room temperature. The cloth was placed in a cylinder wherein it was exposed to a current of nitrogen carrying vapors of toluene diisocyanate. Following this treatment, the wool was washed and air-dried.

This product and a control, in which the exposure to toluene diisocyanate was omitted, were tested by extraction with acetone for 3 hours in a Soxhlet extractor. Shrinkage tests were also conducted before and after extraction. The results are tabulated below:

| Procedure | Wt. of resin on fabric, percent | | Area shrinkage (Accelerotor), percent | |
|---|---|---|---|---|
| | Before extraction | After extraction | Before extraction | After extraction |
| In accordance with invention | 3.4 | 1.7 | 4.0 | 6.9 |
| Control (No application of TDI) | 3.3 | 0 | 18.0 | 26.0 |
| Blank | | | 27.0 | |

Embodiment 3

In accordance with this embodiment of the invention, Component A is a polyurethane, or, more accurately, a polyether (or polyester) containing internal urethane groups and free isocyanate groups. Typical examples of such polymers are exemplified above in the sections entitled "Component A (Polyethers)" and "Component A (Polyesters)," wherein it is explained that these polymers may be prepared by reacting a polyether (or polyester) containing hydroxy groups with an excess of a diisocyanate. An advantageous feature of the polyurethanes is that when they are cross-linked in the phase boundary-limited reaction, they are converted into urethane elastomers and as a result the treated textile material exhibits an especially soft and full hand.

Ordinarily, the polyurethane will contain free isocyanate radicals as the highly reactive groups and since these are water-sensitive, the polymer is applied to the fibrous substrate in the form of an inert, essentially water-immiscible solvent such as benzene, toluene, or the like. The fixative (Component B) is then preferably applied as an aqueous solution. Component B is preferably chosen to provide amine or imine radicals as the complementary, highly reactive group. Typical examples are given above in the section entitled "Component B (Fixative) Containing $NH_2$ or NH groups."

In a variation of the basic procedure of this embodiment, one may apply—as Component A—a polymer of the class of polyethers (or polyesters) containing free hydroxy groups. Typical examples of these are given in the above sections entitled "Component A (Polyethers)" and "Component A (Polyesters)." In such case one would utilize as Component B a compound containing free isocyanate groups (such as those exemplified above in the section entitled "Component B (Fixative) Containing NCO Groups"). In such case the end result of the phase boundary-limited reaction will be a cross-linked polyurethane polymer.

This Embodiment 3 of the invention is further illustrated below:

EXAMPLE XVIII

*Application of an isocyanate-containing polyurethane to wool*

Poly(propylene oxide) glycol of an average molecular weight 2000 and a hydroxyl number of 56 was chain-extended and end-capped with 2,4-tolylenediisocyanate in the following manner: A dry, 3-neck, 500-ml. flask, fitted with stirrer, dropping funnel, nitrogen inlet and thermometer was charged with 100 g. (0.05 mole) poly(propylene oxide) glycol (average molecular weight 2000) and this was heated with stirring under nitrogen to 75° C. Tolylene diisocyanate (17.4 g.—0.1 mole) was then added slowly over a 15–20 minute period via the dropping funnel. The mixture was stirred at 75–80° C. for 3 hours. An infrared spectra of the viscous syrup showed no free —OH but did show the expected strong band at 4.4 microns. (N=C=O) and a weak band at 5.8 microns.

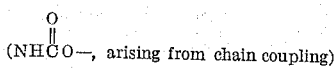

(NHCO—, arising from chain coupling)

The polymer was dissolved in dry toluene. Polymer concentrations of 9 and 2% were used as Solution A. The aqueous treating Solution B contained 4% (by volume) of triethylenetetramine and ca. 0.01% of the wetting agent (isooctylphenyl ether of polyethylene glycol).

Wool cloth was treated with the solutions as in Example I, part 3, using the sequence B–A. As a control, in one run the treatment with Solution B was omitted.

Tests were carried out to determine the shrinkage characteristics of the treated samples and also their permanence to extraction (with benzene, 3 hours). The results are tabulated below:

| Procedure | Wt. of resin on fabric, percent | | Area shrinkage (Accelerotor), percent | |
|---|---|---|---|---|
| | Before extraction | After extraction | Before extraction | After extraction |
| In accordance with invention | 3.3 | 2.3 | 0 | 0 |
| Do | 1.6 | ND | 0 | ND |
| Control (No treatment with Sol. B) | 8.0 | 0 | 8.6 | 22.0 |
| Blank | | | 27 | |

ND=not determined.

It was observed that the products in accordance with the invention had a fuller, softer hand than the original (untreated) fabric.

EXAMPLE XIX

Component A was a polyurethane prepared by reacting a polyether containing hydroxy groups with excess toluene diisocyanate to yield a polymer containing free isocyanate groups (average, more than 2 per molecule). Viscosity of the polyurethane was 1600 centipoises at 40° C., 220 centipoises at 75° C. and contained 3.2 to 3.6% free isocyanate.

*Solution A.*—Three percent of the polyurethane in methyl chloroform.

*Solution B.*—0.5 percent hexamethylene diamine (or ethylene diamine), 0.1% wetting agent (isooctylphenyl ether or polyethylene glycol) in water.

Wool cloth was treated with the solutions as described in Example I, part 3, using the sequence B–A. Shrinkage tests of the products are given below:

| Diamine used | Percent area shrinkage, cumulative* | | | |
|---|---|---|---|---|
| | Wash 1 | Wash 2 | Wash 3 | Wash 4 |
| NMDA | 1.5 | 0.2 | 2.1 | 4.9 |
| EDA | 1.3 | 0.4 | 1.8 | 3.3 |
| Blank (Untreated) | 19.1 | 30.5 | 35.5 | 39.5 |

*In successive 75-minute washes in auotmatic home washing machine, as described above.

EXAMPLE XX

*Solution A.*—A polyoxypropylene triol (average molecular weight 1500; average hydroxyl No. 112) was dissolved in acetone at various concentrations as given below.

*Solution B.*—Three precent by volume of toluene diisocyanate in benzene.

Wool cloth was treated as described in Example I, part 3, using the sequence A–B and the cloth was air-dried after removal from Solution A and prior to entering into Solution B.

The products, and a control sample in which the treatment with Solution B was omitted, were tested for shrinkage before and after extraction with acetone for 3½ hours in a Soxhlet extractor. The results are given below.

| Procedure | Conc. of polyoxypropylene triol in Sol. A, percent | Wt. of resin on fabric, percent | Area shrinkage (Accelerotor), percent | |
|---|---|---|---|---|
| | | | Before extraction | After extraction |
| In accordance with invention | 4 | 4 | 4.0 | 7.0 |
| Do | 2 | 2 | 5.9 | ND |
| Do | 1 | 1 | 7.8 | ND |
| Do | 0.5 | 0.5 | 7.8 | ND |
| Control (Treated with Sol. A only) | 4 | 4 | 18.1 | 23.4 |
| Blank (Untreated) | | | 27 | |

ND=not determined.

*Embodiment 4*

In accordance with this embodiment of the invention, Component A is a polyamide. Typical examples of such polymers are given above in the section entitled "Component A—Polyamides." Especially preferred are the polyamides containing free primary or secondary amino groups. A useful class of such polymers may be prepared, in known manner, by reacting an aliphatic polyamine such as one of the formula $$H_2N(R-NH)_nH$$

(wherein R is a short chain alkylene radical such as —$CH_2$—$CH_2$— and $n$ is 2 to 4) with heat-dimerized, unsaturated, high molecular weight fatty acids. The polyamides of this type are readily emulsifiable in water and may be applied to the fibrous substrate in such form. In this event, Component B is preferably applied in solution in an essentially water-immiscible, organic solvent such as benzene, toluene, or the like. Since the highly reactive groups of the preferred class of polyamides are primary or secondary amino groups, Component B is selected to contain complementary reactive groups, e.g., carbonyl halide, sulphonyl halide, haloformate, carbamyl halide, anhydride, or isocyanate. Suitable compounds of these types are given above in the sections listing the various types of Component B. Generally, compounds containing isocyanate groups are preferred as they not only form the cross-links rapidly but cause no evolution of acidic by-products (as is the case with acid halide fixatives).

Another useful plan for applying the aforesaid polyamides containing free amino groups involves applying the polyamide to the substrate as a solution in a hydroxylated organic solvent such as ethanol or isopropanol (in which they are easily soluble). The treated substrate is then dried to remove the solvent and the substrate then treated with the isocyanate-containing fixative dissolved in a solvent such as benzene or toluene, thus to accomplish the cross-linking at a solid-liquid boundary.

This Embodiment 4 of the invention is further illustrated below.

EXAMPLE XXI

Component A was a polyamide—a condensation product of diethylene triamine and heat-dimerized unsaturated (mainly $C_{18}$) fatty acids—containing free primary and secondary amine groups. An idealized structure of this compound may be represented by the following:

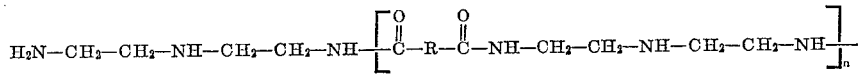

wherein

represents the acyl radical of the dimerized fat acid and $n$ is the number of repeating units, usually about 20 to 60. The polyamide had an amine value of 290–320 (amine value is the milligrams equivalent of KOH per gram of polyamide) and a viscosity in a Brookfield viscometer at 40° C. of 80–120 poises.

*Solution A.*—The above polyamide in isopropanol at various concentrations given below.

*Solution B.*—Toluene diisocyanate (4% by volume) in benzene.

Wool swatches were wet-out in Solution A for various times (as given below), passed through a squeeze roll, and air-dried at room temperature for one hour to remove solvent. The dried swatches were then dipped in Solution B at room temperature for one minute, passed through a squeeze roll, hand washed and air-dried. Shrinkage tests on the products and a control sample (whereon the treatment with Solution B was omitted) were tested for shrinkage. The results are given below.

| Run | Procedure | Wt. polyamide in Sol. A, percent | Immersion time in Sol. A, sec. | Area shrinkage (Accelerotor), percent |
|---|---|---|---|---|
| 1 | In accordance with invention. | 10 | 60 | 0 |
| 2 | do | 5 | 60 | 0 |
| 3 | do | 2.5 | 60 | 0 |
| 4 | do | 1.25 | 60 | 0 |
| 5 | do | 0.6 | 60 | 0 |
| 6 | do | 0.5 | 20 | 6 |
| 7 | do | 0.25 | 20 | 6 |
| 8 | do | 0.125 | 20 | 9 |
| 9 | Control (No treatment in Sol. B). | 10 | 60 | 22 |
| 10 | Blank (Untreated) | | | 27 |

The products of run 1 in accordance with the invention and the control (run 9) were subjected to shrinkage tests before and after extraction with isopropanol for 5 hours in a Soxhlet extraction. The results are given below:

| Run | Procedure | Wt. of resin on fabric | | Area shrinkage (Accelerotor), percent | |
|---|---|---|---|---|---|
| | | Before extraction | After extraction | Before extraction | After extraction |
| 1 | In accordance with invention. | 20 | 20 | 0 | 0 |
| 9 | Control (No treatment with Sol. B). | 12 | 0 | 22 | 23.3 |
| 10 | Blank (Untreated). | | | 27 | |

EXAMPLE XXII

*Solution A.*—The polyamide of Example XXI was dissolved in isopropanol in concentration of 20%. One volume of this solution was poured into 5 volumes of water containing ca. 0.01% of non-ionic wetting agent, applying vigorous agitation to form an emulsion. This emulsion was further diluted to various concentrations as given below.

*Solution B.*—Two percent toluene diisocyanate in methyl chloroform.

Samples of wool cloth and wool top (wool top is a thick but very open and loosely assembled strand of wool fibers with no twist) were treated with the solutions as described in Examples I, part 3, using the sequence A–B. Tests for shrinkage of the products are tabulated below:

| Procedure | Conc. of polyamide in Sol. A, percent | Area shrinkage of fabric (Accelerotor), percent | Lengthwise shrinkage of top (Accelerotor), percent |
|---|---|---|---|
| In accordance with invention | 0.5 | 6.9 | 3.4 |
| Do | 0.25 | 7.8 | 5.8 |
| Do | 0.12 | 10.7 | 8.2 |
| Do | 0.06 | 12.6 | 9.5 |
| Control (Treated with Sol. B only) | | 27 | 15.0 |
| Control (Treated with Sol. A only) | 2.0 | 27 | 18 |
| Blank (Untreated) | | 27 | 25 |

EXAMPLE XXIII

Wool top was treated with solutions of various complementary Components A and B, using the technique described in Example I, part 3. The products were tested for shrinkage in the following manner: The products were gilled to remove any fiber-to-fiber bonding which may have occurred during treatment. The products were then cut to standard length (50 cm.), sewn into a casing of cheesecloth, and given a 15-minute wash in a agitator-type household washing machine. After washing and air-drying, the samples were measured to determine the percentage of shrinkage. The components used and the results of the tests are tabulated below:

| Sequence of treatment | Component A and conc. in Sol. A, percent | Component B and conc. in Sol. B, percent | Shrinkage in length, percent |
|---|---|---|---|
| A*-B | PA, 2 | TDI, 3 | 0.8 |
| A*-B | PA, 1 | TDI, 3 | 2.2 |
| A*-B | PA, 0.5 | TDI, 3 | 5.5 |
| B-A | PU, 1.5 | HMDA, 0.5 | 11.0 |
| B-A | Ter, 1,5 | HMDA, 0.5 | 13.0 |
| Control | | | 28.5 |

*Air-dried before entering next solution.
Abbreviations: PA=polyamide as described in Ex. XXI, in isopropanol; PU=polyurethane as described in Ex. XIX, in methyl chloroform; Ter=terpolymer of ethylene, vinyl acetate, and methacrylyl chloride as described in Ex. I, in methyl chloroform; TDI=toluene diisocyanate in methyl chloroform; HMDA=hexamethylene diamine, in water plus 0.05% non-ionic wetting agent.

*Embodiment 5*

In accordance with this embodiment, Component A is a polysiloxane. A particular benefit achieved with such copolymers is the imparting to the fibers of a high degree of water repellency and consequently resistance to soils. Generally, the polysiloxane will contain hydroxy or amine radicals as the highly reactive groups and the polymer is preferably applied as a solution (or emulsion) in water. Component B is a compound containing carbonyl halide, sulphonyl halide, haloformate, carbamyl halide, anhydride, or isocyanate groups (the latter being preferred) and is applied as a solution in an essentially water-immiscible solvent such as benzene, toluene, or the like.

This Embodiment 5 of the invention is further illustrated below:

EXAMPLE XXIV

Component A was a commercial polysiloxane containing more than three amino groups per molecule. This polymer had a specific gravity of .988 to 1.005 at 25° C., viscosity 100 to 400 centistokes and contained 5.5 to 6.3% free $NH_2$. The repeating unit of the polysiloxane is believed to have the structure

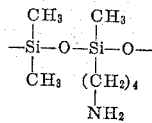

*Solution A.*—The above polysiloxane was stirred into water containing added acetic acid to give a pH of about 11 in the resulting milky solution. One solution at a concentration of 3% polysiloxane and another at 1.5% polysiloxane were thus prepared.

*Solution B.*—2% (by volume) of 2,4-toluene diisocyanate in methyl chloroform.

Wool cloth was treated with the above solutions as in Example I, part 3, using the sequence A-B.

The results of tests on the products are given below:

| Conc. of polysiloxane in Sol. A, percent | Wt. of resin on cloth, percent | Water repellency | | | Area shrinkage (Accelerotor, after extraction*), percent |
|---|---|---|---|---|---|
| | | Before extraction | After extraction* | After Accelerotor wash | |
| 3 | 2 | 80 | 100 | 100 | 3.0 |
| 1.5 | 0.5 | 80 | 100 | 100 | 7.8 |
| Control (Untreated) | 0 | 50 | | | 27.0 |

*Extraction with benzene, 3 hours in Soxhlet extractor.
NOTE.—Increase in water repellency after extraction and after washing believed due to removal of unreacted hydrophilic materials from cloth.

Having thus described our invention, we claim:

1. Fibrous material carrying a deposit of a polymer cross-linked through reaction with a fixative, said polymer being a copolymer of (1) a minor proportion of a polymerizable monomer containing a $CH_2{=}C{<}$ grouping and a carbonyl halide group and (2) a major proportion of an olefine, said fixative being a polyamine.

2. The product of claim 1 wherein the fibrous material is wool and said deposit is chemically bonded thereto.

3. Fibrous material carrying a deposit of a polymer cross-linked through reaction with a fixative, said polymer being a copolymer of (1) a minor proportion of a polymerizable monomer containing a $CH_2{=}C{<}$ grouping and a carbonyl halide group, (2) a major proportion of an olefine, and (3) a polymerizable ester containing a $CH_2{=}C{<}$ grouping, said fixative being a polyamine.

4. The product of claim 3 wherein the fibrous material is wool and wherein said deposit is chemically bonded thereto.

5. The product of claim 3 wherein the polymerizable monomer (1) is methacryloyl chloride.

6. The product of claim 3 wherein the olefine (2) is ethylene.

7. The product of claim 3 wherein the polymerizable ester (3) is vinyl acetate.

8. The product of claim 3 wherein the fixative is an aliphatic diamine.

9. Fibrous material carrying a deposit of a polymer cross-linked through reaction with a fixative, said polymer being a copolymer of (1) a minor proportion of a polymerizable monomer containing a $CH_2{=}C{<}$ grouping and a carbonyl halide group and (2) a major proportion of a polymerizable ester containing a $CH_2{=}C{<}$ grouping, said fixative being a polyamine.

10. The product of claim 9 wherein the polymerizable monomer (1) is methacryloyl chloride.

11. The product of claim 9 wherein the polymerizable ester (2) is lauryl methacrylate.

12. The product of claim 9 wherein the fixative is an aliphatic diamine.

13. The product of claim 9 wherein the fibrous material is wool and wherein the said deposit is chemically bonded thereto.

14. Fibrous material carrying a deposit of a polymer cross-linked through reaction with a fixative, said polymer being a copolymer of (1) a minor proportion of a polymerizable monomer containing a $CH_2{=}C{<}$ grouping and a carbonyl halide group and (2) a major proportion of a polymerizable fluorinated monomer containing a $CH_2{=}C{<}$ grouping, said fixative being a polyamine.

15. The product of claim 14 wherein the fibrous material is wool and wherein the said deposit is chemically bonded thereto.

References Cited

UNITED STATES PATENTS

| 2,678,286 | 5/1954 | Bruner et al. | 117—141 |
| 2,678,287 | 5/1954 | Cupery et al. | 117—141 |
| 2,780,608 | 2/1957 | Hurwitz et al. | 117—141 X |
| 2,842,509 | 7/1958 | Shannon | 117—126 X |
| 2,890,097 | 6/1959 | Coe | 8—128 |
| 3,084,019 | 4/1963 | Whitfield et al. | 117—141 X |
| 3,078,138 | 2/1963 | Miller et al. | 117—141 X |
| 3,100,674 | 8/1963 | Steiger et al. | 8—128 X |

WILLIAM D. MARTIN, *Primary Examiner.*

T. G. DAVIS, *Assistant Examiner.*